US011762366B2

(12) United States Patent
Yamada

(10) Patent No.: US 11,762,366 B2
(45) Date of Patent: Sep. 19, 2023

(54) SHEET PROCESSING APPARATUS

(71) Applicant: DUPLO SEIKO CORPORATION, Kinokawa (JP)

(72) Inventor: Kenta Yamada, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 250 days.

(21) Appl. No.: 16/845,436

(22) Filed: Apr. 10, 2020

(65) Prior Publication Data
US 2020/0333761 A1   Oct. 22, 2020

(30) Foreign Application Priority Data
Apr. 17, 2019   (JP) .................................. 2019-078455

(51) Int. Cl.
 *B65H 5/06* (2006.01)
 *B65H 35/06* (2006.01)
 (Continued)

(52) U.S. Cl.
 CPC .......... *G05B 19/188* (2013.01); *B65H 5/062* (2013.01); *B65H 35/06* (2013.01); *B26F 1/18* (2013.01); *G05B 2219/45234* (2013.01)

(58) Field of Classification Search
 CPC ........ G05B 2219/45234; G05B 19/188; B65H 35/06; B65H 5/062; B65H 2513/106; B26D 1/09; G06Q 10/043; G05G 19/188
 See application file for complete search history.

(56) References Cited

U.S. PATENT DOCUMENTS 3,735,660 A * 5/1973 Pearl ....................... B26F 1/382
                                                      83/940
6,506,324 B1 * 1/2003 Gerber ...................... B31F 1/10
                                                      264/161
(Continued)

FOREIGN PATENT DOCUMENTS

EP           3308914 A1      4/2018
JP        2013202776 A  *  10/2013
JP           5931411 B2      6/2016

OTHER PUBLICATIONS

The extended European Search Report dated Oct. 6, 2020, by the European Patent Office in corresponding European Application No. 20169452.8. (8 pages).

(Continued)

*Primary Examiner* — Jennifer Bahls
(74) *Attorney, Agent, or Firm* — BUCHANAN INGERSOLL & ROONEY PC

(57) ABSTRACT

A sheet processing apparatus includes: at least one processing tool that takes a processable state and an unprocessable state; a setting unit that sets operation parameters on the processable state and the unprocessable state; and a control unit that controls an operation of the processing tool based on the set operation parameters, in which the setting unit sets the operation parameters such that: a processable state holding process in which the processing tool holds the processable state, is executed, when a certain portion-to-be-processed is formed in a certain pre-product and then a next portion-to-be-processed of the same type as the certain portion-to-be-processed is formed in a next pre-product; and/or a processing tool selection process in which the processing tool for forming the portion-to-be-processed is selected so that a moving distance of the processing tool is minimized, is executed.

9 Claims, 19 Drawing Sheets

(51) Int. Cl.
*G05B 19/18* (2006.01)
*B26F 1/18* (2006.01)

(56) References Cited

U.S. PATENT DOCUMENTS

| | | | |
|---|---|---|---|
| 2004/0085422 A1* | 5/2004 | Kelley | B41J 11/66 347/101 |
| 2014/0116218 A1* | 5/2014 | Kwarta | B26D 9/00 83/562 |
| 2014/0121085 A1 | 5/2014 | Kwarta et al. | |

OTHER PUBLICATIONS

Notice of Reasons for Refusal issued in corresponding Japanese Patent Application No. 2019-078455, dated Aug. 18, 2022, with English Translation (4 pages).

* cited by examiner

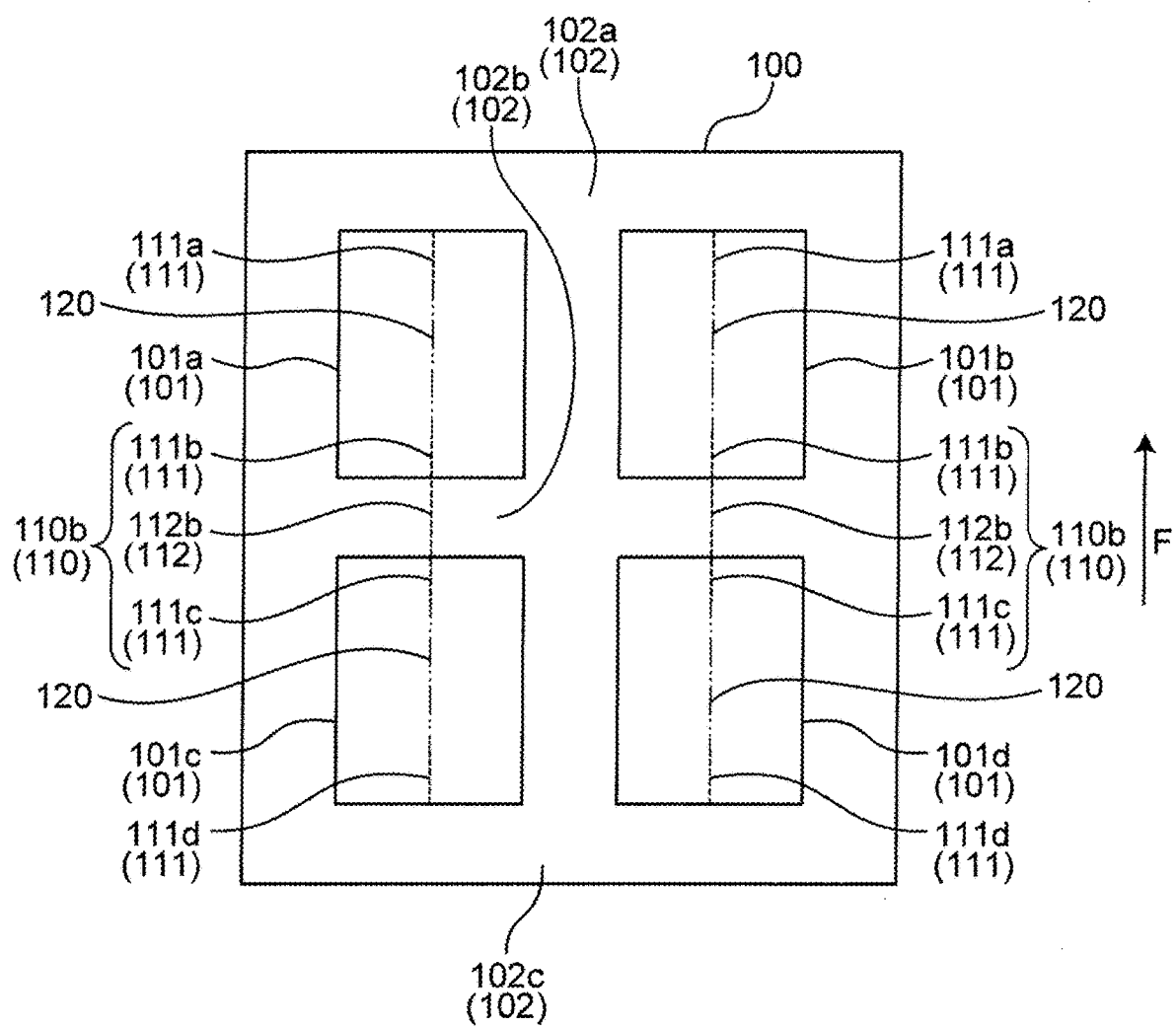

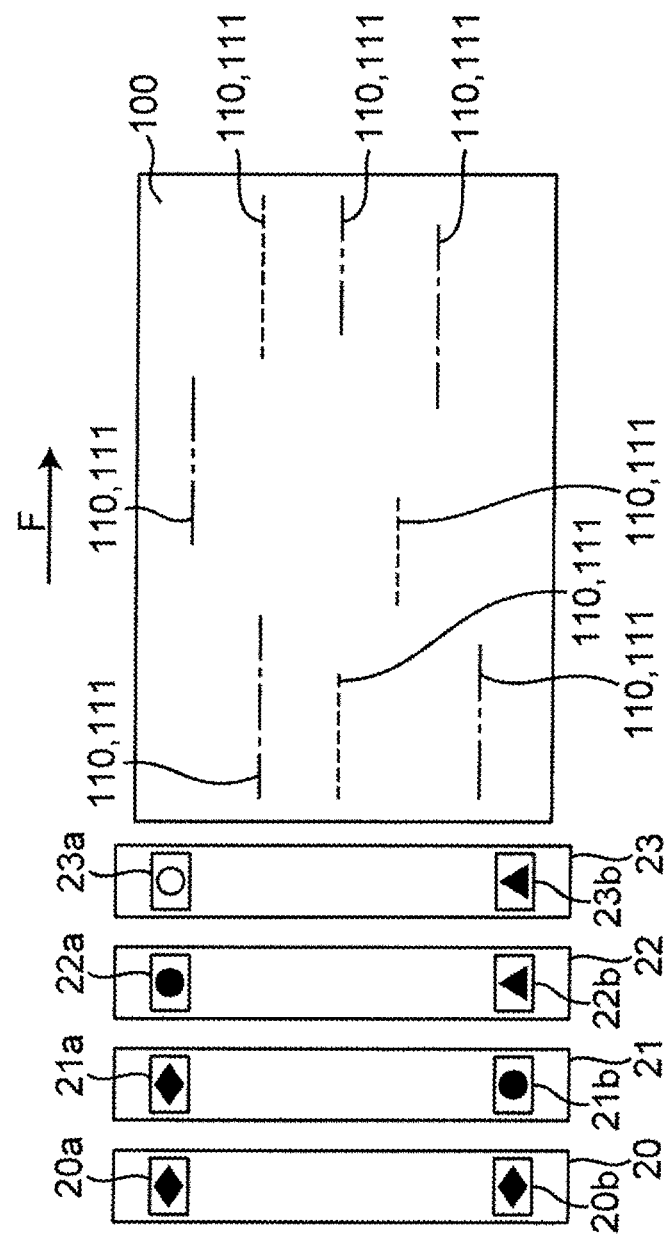

SHEET PROCESSING APPARATUS

BACKGROUND OF THE INVENTION

1. Field of the Invention

This invention relates to a sheet processing apparatus that forms a portion-to-be-processed on a sheet having a pre-product.

2. Description of the Related Art

Sheet processing apparatuses that form portions-to-be-processed on a sheet having pre-products are known. For example, JP 5931411 B2 discloses a sheet processing apparatus that forms a perforation as the portion-to-be-processed. In the sheet processing apparatus of JP 5931411 B2, the portion-to-be-processed is formed on a sheet with a processing tool for perforation contacting the sheet, and the portion-to-be-processed is not allowed to be formed with the processing tool separating from the sheet.

SUMMARY OF THE INVENTION

In the sheet processing apparatus of JP 5931411 B2, a contact operation in which the processing tool contacts the sheet is performed only when it is necessary to form the portion-to-be-processed, and at times other than that, a separation operation in which the processing tool separates from the sheet is performed. When the contact operation is shifted to the separation operation, it is controlled such that: after the conveyance of the sheet is stopped, the processing tool is separated from the sheet; and then the conveyance of the sheet is started. When the separation operation is shifted to the contact operation, it is controlled such that: after the conveyance of the sheet is stopped, the processing tool contacts the sheet; and then the conveyance of the sheet is started. When the contact operation and the separation operation are performed, two time periods are required, including a conveyance restart time for restarting the conveyance of the sheet after the conveyance of the sheet is stopped (the conveyance restart time also includes time losses due to the acceleration and deceleration before and after the stop in addition to a time during which the sheet is stopped) and a processing tool movement time for the contact/separation of the processing tool.

When the separation operation is performed on a portion where the portion-to-be-processed is not required to be formed inside the pre-product on the sheet, the portion-to-be-processed is not formed in the pre-product on the sheet. When the portion-to-be-processed is not formed, the separation operation for not forming the portion-to-be-processed and the contact operation for forming the next portion-to-be-processed are required. Therefore, when the portion-to-be-processed is not allowed to be formed, the processing tool movement time and the conveyance restart time related to the separation operation and the contact operation are required.

In the conventional sheet processing apparatus, a user is required to determine whether the portion-to-be-processed is formed in a portion (e.g., a margin) of a sheet other than pre-products, in consideration of the conveyance restart time and the processing tool movement time. However, it is up to a user to determine how to shorten the time required for forming the portion-to-be-processed.

It is also required to determine which processing tool is to be used and which portion-to-be-processed is to be processed, and in that case, it is also up to a user to determine how to shorten the time required for forming the portion-to-be-processed.

As described above, the determination on whether the portion-to-be-processed is formed in a portion other than pre-products and the determination on which processing tool is to be used are conventionally up to a user, and hence the time required for processing is not necessarily shortened.

Therefore, a technical problem to be solved by this invention is to provide a sheet processing apparatus that minimizes a time required for processing.

According to this invention, the following sheet processing apparatus is provided in order to solve the above technical problem.

That is, the sheet processing apparatus according to this invention is one that forms a portion-to-be-processed on a sheet having a pre-product, the sheet processing apparatus including:

at least one processing tool that takes a processable state in which the portion-to-be-processed is allowed to be formed and an unprocessable state in which the portion-to-be-processed is not allowed to be formed;

a setting unit that sets operation parameters on the processable state and the unprocessable state; and a control unit that controls an operation of the processing tool based on the set operation parameters, in which the setting unit sets the operation parameters such that: a processable state holding process in which the processing tool holds the processable state, is executed, when a certain portion-to-be-processed is formed in a certain pre-product and then a next portion-to-be-processed of the same type as the certain portion-to-be-processed is formed in a next pre-product; and/or a processing tool selection process in which the processing tool for forming the portion-to-be-processed is selected so that a moving distance of or a time required for movement of the processing tool is minimized, is executed.

The "pre-product" in this specification refers to an object that is provided on a sheet in a tangible or intangible form and is in a state before being processed into a product by cutting, etc.

The "product" in this specification refers to an object obtained from the sheet by processing the pre-product by cutting, etc.

According to the above configuration, when a certain portion-to-be-processed is formed in a certain pre-product and then a next portion-to-be-processed of the same type as the certain portion-to-be-processed is formed in the next pre-product, a time required for processing can be minimized by setting operation parameters such that: the processable state is held; and/or a processing tool is selected so that a moving distance of the processing tool is minimized.

BRIEF DESCRIPTION OF THE DRAWINGS

FIG. 3B is a schematic view illustrating an example in which a portion-to-be-processed and a marginal portion-to-be-processed are formed on a sheet having pre-products;

FIG. 15 is a schematic view illustrating yet another example in which a processing tool is selected.

DETAILED DESCRIPTION OF THE INVENTION

Hereinafter, a sheet processing apparatus 1 and a sheet processing method will be described with reference to the drawings, and for convenience of description, the downstream side in a conveyance direction F is referred to as a "front" or simply a "downstream side", as described in FIG. 1, etc. The upstream side in the conveyance direction F is referred to as a "rear" or simply an "upstream side." The upper and lower portions with a conveyance route 10 being interposed therebetween are referred to as an "upper side" and a "lower side", respectively. A sheet width direction (horizontal direction perpendicular to the conveyance direction F) is referred to as a "left-right direction", and a "right side" and a "left side" are defined according to a state when viewed from the rear. In this invention, the sheet includes not only a paper sheet but also a resin sheet.

(Overall Configuration of Sheet Processing Apparatus)

Figure 1:
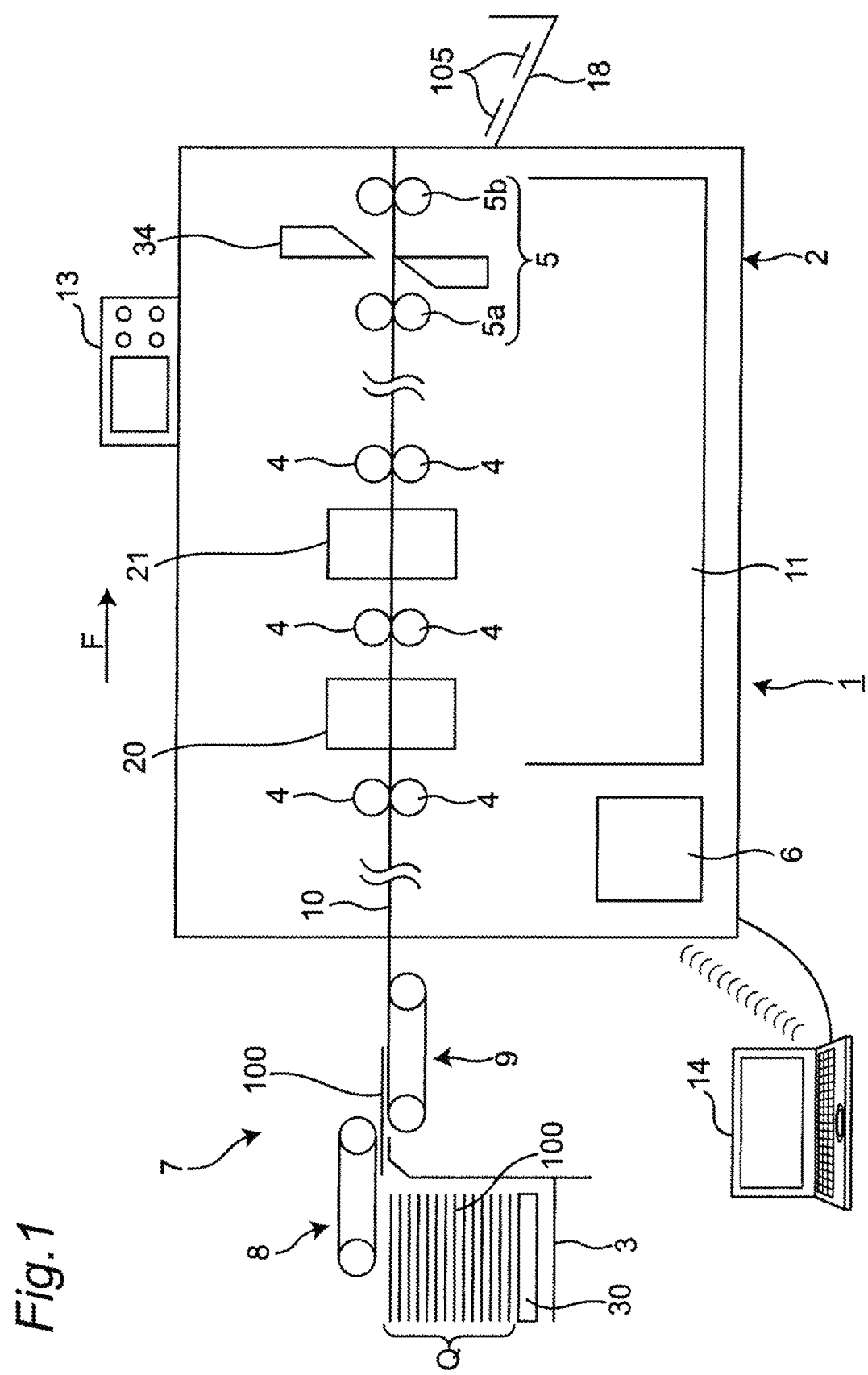
FIG. 1 is a longitudinal sectional view schematically illustrating an overall configuration of a sheet processing apparatus according to one embodiment of this invention.

FIG. 1 is a longitudinal sectional view schematically illustrating an overall configuration of the sheet processing apparatus 1 according to one embodiment of this invention. The sheet processing apparatus 1 includes a supply device 7, an apparatus main body 2, a cutting processing unit 5, a discharge tray 18, a display setting unit 13, and an external setting unit 14. The supply device 7 sends out, in the conveyance direction F, sheets 100 one by one from a large number of the sheets 100 that are loaded (sheet bundle Q). The apparatus main body 2 processes the sheet 100 sent out from the supply device 7 while conveying the sheet 100. In the route from the supply device 7 to the discharge tray 18, the conveyance route 10 is formed by a conveyance unit including a plurality of rollers 4, an upstream side roller pair 5a, and a downstream side roller pair 5b. The position of the sheet 100 that is being conveyed is appropriately detected by a sheet detection sensor provided in the middle of the conveyance route 10.

The supply device 7 includes a supply unit 3, a suction conveyance mechanism 8, and a skew conveyance mechanism 9. The supply unit 3 includes a supply table 30 on which a large number of the sheets 100 are loaded and which is configured to be able to move up and down. The supply table 30 is moved up and down electrically using a lifting device that uses a supply table lifting motor as a drive source. The upper limit position and lower limit position of the supply table 30 are detected by an upper limiter switch and a lower limiter switch, respectively, and the limiter switches function as a safety device in case of emergency.

On the conveyance route 10, at least one processing unit and a cutting blade 34 are provided in order from the side of the supply device 7 (i.e., from the upstream side toward the downstream side). On the conveyance route 10 illustrated in FIG. 1, a first processing unit 20, a second processing unit 21, and the cutting blade 34 are at least provided. The cutting blade 34 cuts the sheet 100 in a conveyance perpendicular direction (left-right direction) perpendicular to the conveyance direction F. The sheet processing apparatus 1 has a trash box 11 at a bottom of the apparatus main body 2, the trash box 11 being used for collecting cutting waste generated when the sheet 100 is cut.

Each of the first processing unit 20, the second processing unit 21, and the cutting blade 34 can be provided as a detachable unit with respect to the apparatus main body 2, or can be fixed to the apparatus main body 2. When they are used as a unit, they are configured to have the same dimension and shape in appearance such that they can be detached to and from any installation location. A drive unit (not illustrated) is connected to each of the first processing unit 20, the second processing unit 21, and the cutting blade 34. Herein, the first processing unit 20 and the second processing unit 21 are defined as a broad concept including at least one processing unit, not meaning just two processing units. Examples of the processing unit include a vertical perforation processing unit, a horizontal perforation processing unit, a vertical slit unit, a horizontal slit unit, a vertical folding (crease) unit, a horizontal folding (crease) unit, a rounding unit, a vertical half-cut unit, a horizontal half-cut unit, a vertical processing unit, a horizontal processing unit, etc. In the vertical processing unit and the horizontal processing unit, the blades can be replaced individually one by one (e.g., in one vertical processing unit, different types of blades, such as a perforated blade and a crease blade, can be attached, or blades of the same type can be attached). Depending on a processing application, a processing unit that is required is selected from these various processing units, and the selected processing unit is installed at an appropriate position in the apparatus main body 2.

Figure 5A:
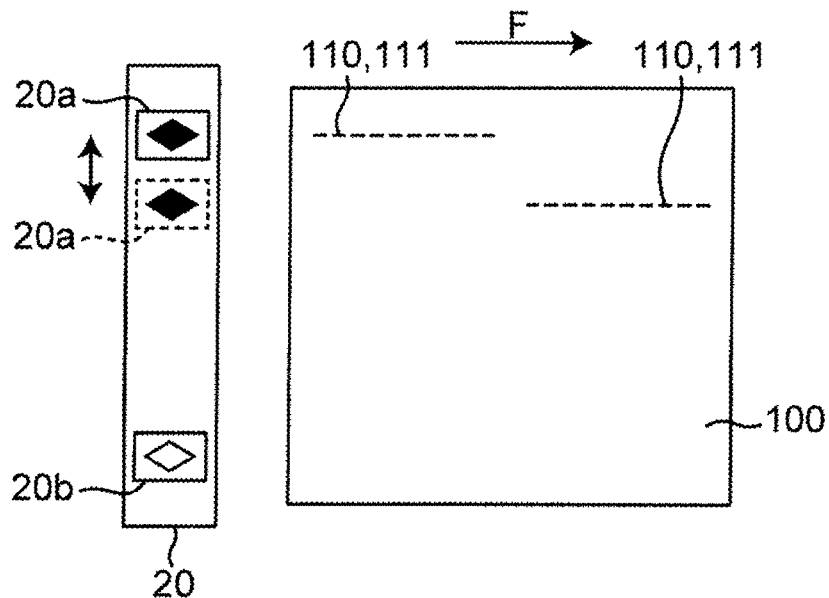
FIGS. 5A and 5B are schematic views each illustrating an example in which a processing tool is selected.
Figure 5B:
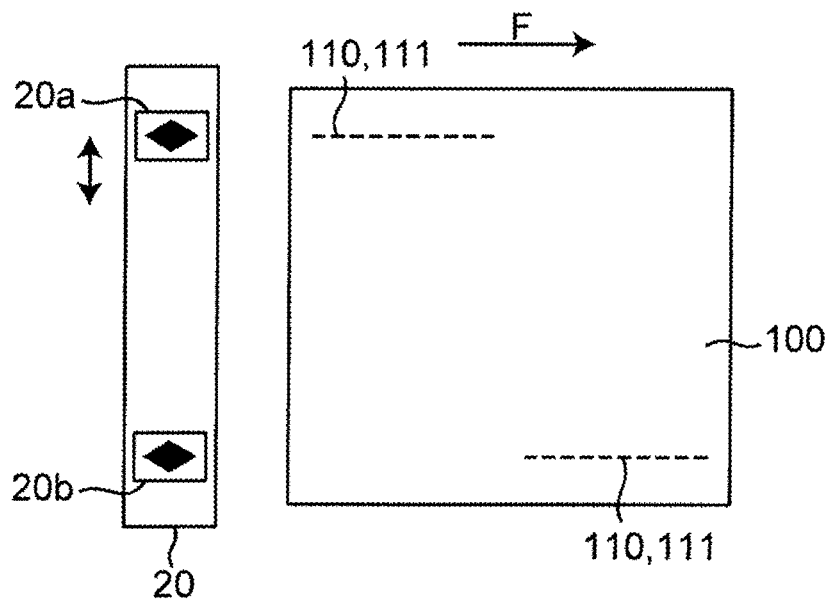
Figure 6A:
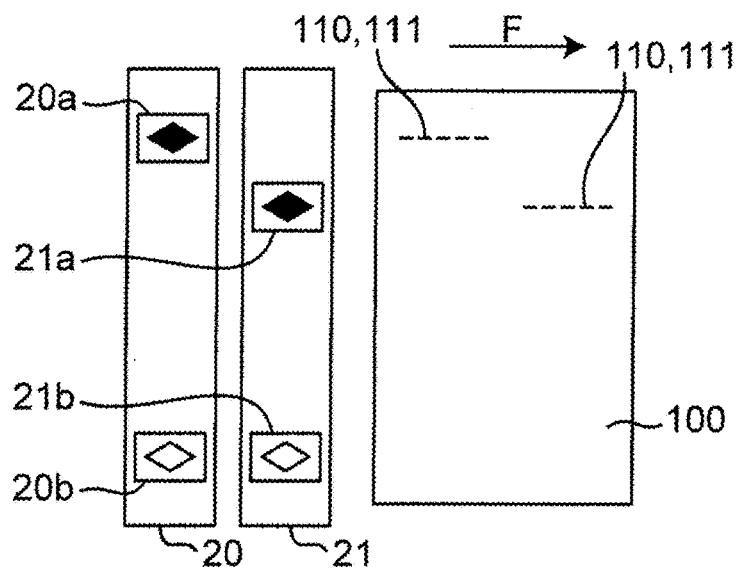
FIGS. 6A to 6C are schematic views each illustrating another example in which a processing tool is selected.
Figure 6B:
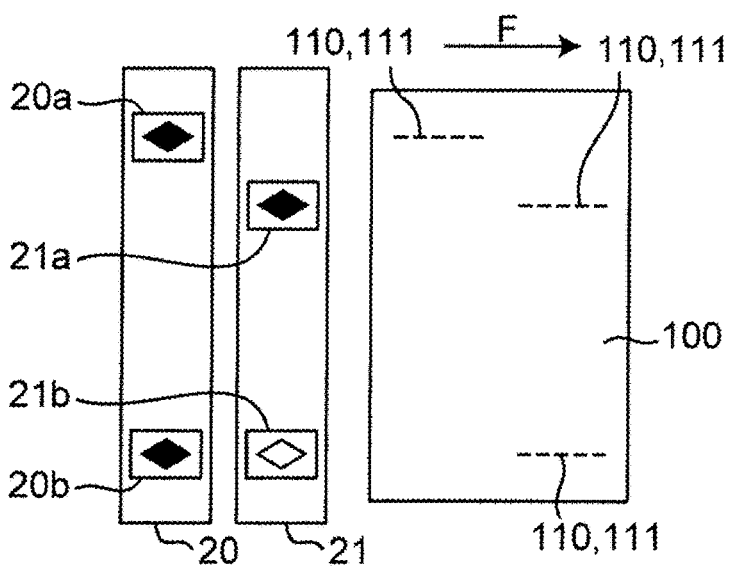
Figure 6C:
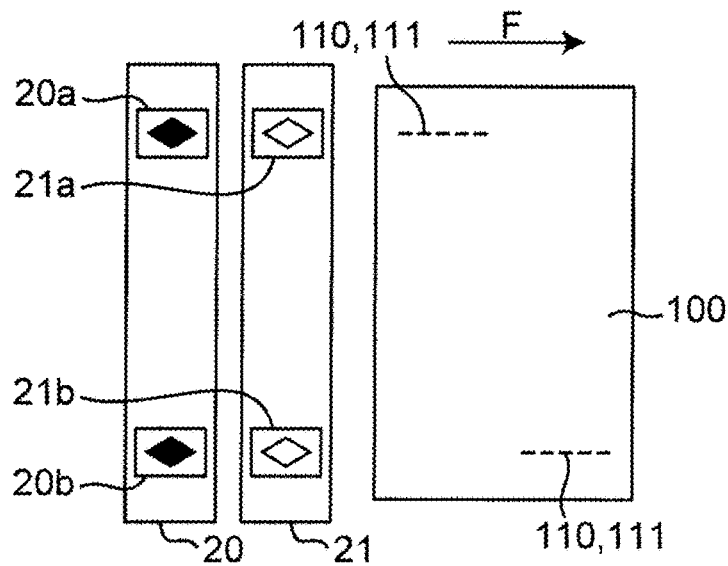

In FIGS. 5A and 5B, the first processing unit 20 is provided as the processing unit, and in FIGS. 6A to 6C, the first processing unit 20 and the second processing unit 21 are provided as the processing unit. Each of the first processing unit 20 and the second processing unit 21 has at least one processing tool, as illustrated in FIGS. 5A to 6C. For example, as processing tools for forming a perforation as a portion-to-be-processed 111, a perforation blade and a receiving blade roll, with the conveyance route 10 being interposed therebetween, are used.

The processing tool (upper processing tool) arranged above the conveyance route 10 is configured to rise (separate) or descend (contact) by a lifting mechanism driven by a lifting drive unit. The processing tool is configured to move in the conveyance perpendicular direction (left-right direction) by a width-direction moving mechanism driven by a width-direction drive unit.

The processing tool is configured to take a processable state in which the portion-to-be-processed 111 is allowed to be formed and an unprocessable state in which the portion-to-be-processed 111 is not allowed to be formed. In the processable state, the upper processing tool descends to a position where it contacts the sheet 100. In the unprocessable state, the upper processing tool rises to a position where it separates from the sheet 100. In the unprocessable state, an unprocessable portion 120 is virtually formed in a pre-product 101 on the sheet 100, as illustrated in FIGS. 3A to 4C, but realistically nothing is formed. Therefore, the unprocessable portion 120 is just virtual, and is illustrated by a two-dot chain line in FIGS. 3A to 4C.

The cutting processing unit 5 includes the cutting blade 34 that cuts the sheet 100 in the conveyance perpendicular direction (left-right direction) perpendicular to the conveyance direction F, the upstream side roller pair 5a arranged on the upstream side of the cutting blade 34, and the downstream side roller pair 5b arranged on the downstream side of the cutting blade 34. The cutting blade 34 includes a movable blade arranged above the conveyance route 10 and a fixed blade arranged below the conveyance route 10. Each of the movable blade and the fixed blade extends in the conveyance perpendicular direction. The movable blade is connected to a drive source, such as a movable blade drive motor, via a power transmission mechanism. The movable blade is inclined so as to become lower as it goes from the blade edge to the blade base with respect to the substantially horizontal direction, and moves parallel in the vertical direction by a driving force of a movable blade drive motor, etc., while maintaining the inclined state. A product 105 is created by cutting various margins 102 (so-called "dove"), such as a boundary portion between the pre-products 101 with each other, adjacent in the conveyance direction F, a margin 102 between the pre-products 101, 101 adjacent in the conveyance direction F, a margin 102 ahead of the foremost pre-product, and a margin 102 behind the last pre-product, with the movable blade descending.

The display setting unit 13 is provided in the apparatus main body 2. The display setting unit 13 has a setting function of inputting and setting an operation parameter for operating the apparatus main body 2, and a display function of displaying information on an operation state of the apparatus main body 2. Therefore, the display setting unit 13 functions as a setting unit that inputs and sets the operation parameter. The display setting unit 13 includes an input unit for inputting information, a display unit for displaying input contents, setting contents, etc., and a calculation unit for calculating and generating an operation parameter based on the input contents and setting contents.

The external setting unit 14 is a device having a setting function of inputting information and setting an operation parameter for operating the apparatus main body 2. The external setting unit 14 functions as a setting unit that inputs and sets an operation parameter. The external setting unit 14 is provided outside the apparatus main body 2, and is, for example, a desktop personal computer, a notebook personal computer, a tablet PC, a smartphone, etc. The external setting unit 14 includes an input unit for inputting information, a display unit for displaying input contents and setting contents, and the calculation unit for calculating and generating an operation parameter based on the input contents and setting contents. The external setting unit 14 includes a communication unit that exchanges various data for operating the apparatus main body 2 by wired or known wireless communication (e.g., Wi-Fi, Bluetooth (registered trademark), etc.). Alternatively, the external setting unit 14 may have the same control function as the later-described control unit 6.

(Electrical Configuration of Sheet Processing Apparatus)

Figure 2:
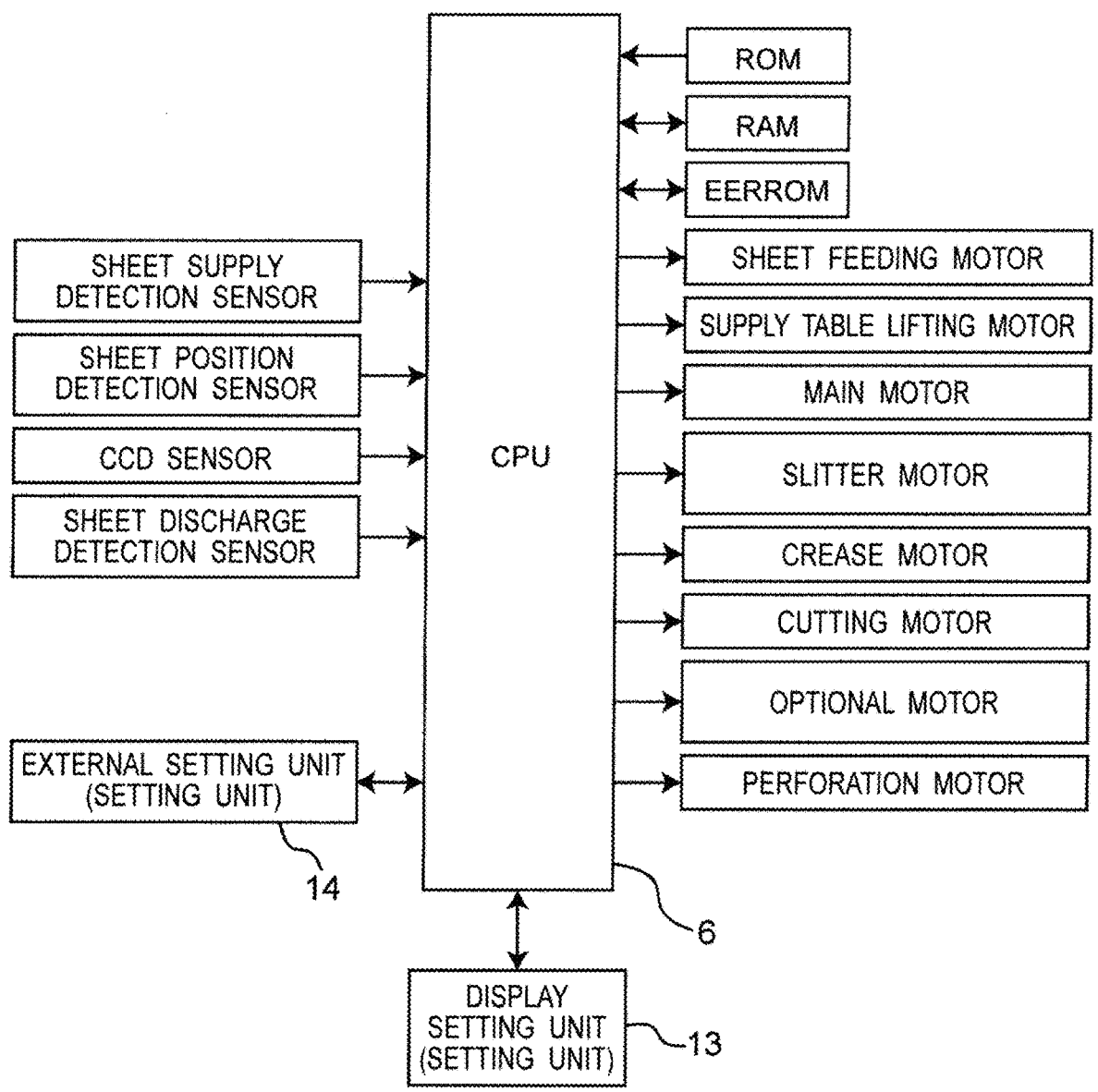
FIG. 2 is a block diagram illustrating an electrical configuration of the sheet processing apparatus.

FIG. 2 is a block diagram illustrating an electrical configuration of the sheet processing apparatus 1. The sheet processing apparatus 1 includes, in the apparatus main body 2, a control unit (CPU: central processing unit) 6 that controls various operations of the sheet processing apparatus 1. A read only memory (ROM), a random access memory (RAM), an electrically erasable and writable memory (EEPROM), switches on the operation panel, various motors such as the main motor, and various sensors such as a sheet position detection sensor are connected to the control unit 6 via I/O ports. The control unit 6 controls the overall operations of the sheet processing apparatus 1, controls the conveyance position of the sheet 100, and controls the operations of the processing tools of the first processing unit 20 and the second processing unit 21 and various components of the cutting processing unit 5. In the display setting unit 13 or the external setting unit 14, various operation parameters are set and registered, and error information is reported. The report of information is performed by a display on the display surface of the display setting unit 13 or a sound notification by a speaker. The display setting unit 13 is provided with a start button for starting a series of sheet processing operations.

In order to minimize the time required for forming the portion-to-be-processed 111 for the processing information input by a user, the display setting unit 13 or the external setting unit 14 automatically sets an operation parameter so as to form a marginal portion-to-be-processed 112. Herein, the time required for forming the portion-to-be-processed 111 means "the time required for moving the processing tool to a position in the conveyance perpendicular direction corresponding to the formation of the portion-to-be-processed 111"+"the time for switching the state of the processing tool to the processable state or the unprocessable state."

(Example in which Portion-to-be-Processed and Marginal Portion-to-be-Processed are Formed on Sheet Having Pre-Product)

An example in which the portion-to-be-processed 111 and the marginal portion-to-be-processed 112 are formed on the sheet 100 having the pre-product 101 will be described with reference to FIGS. 3A to 4C.

Figure 3A:
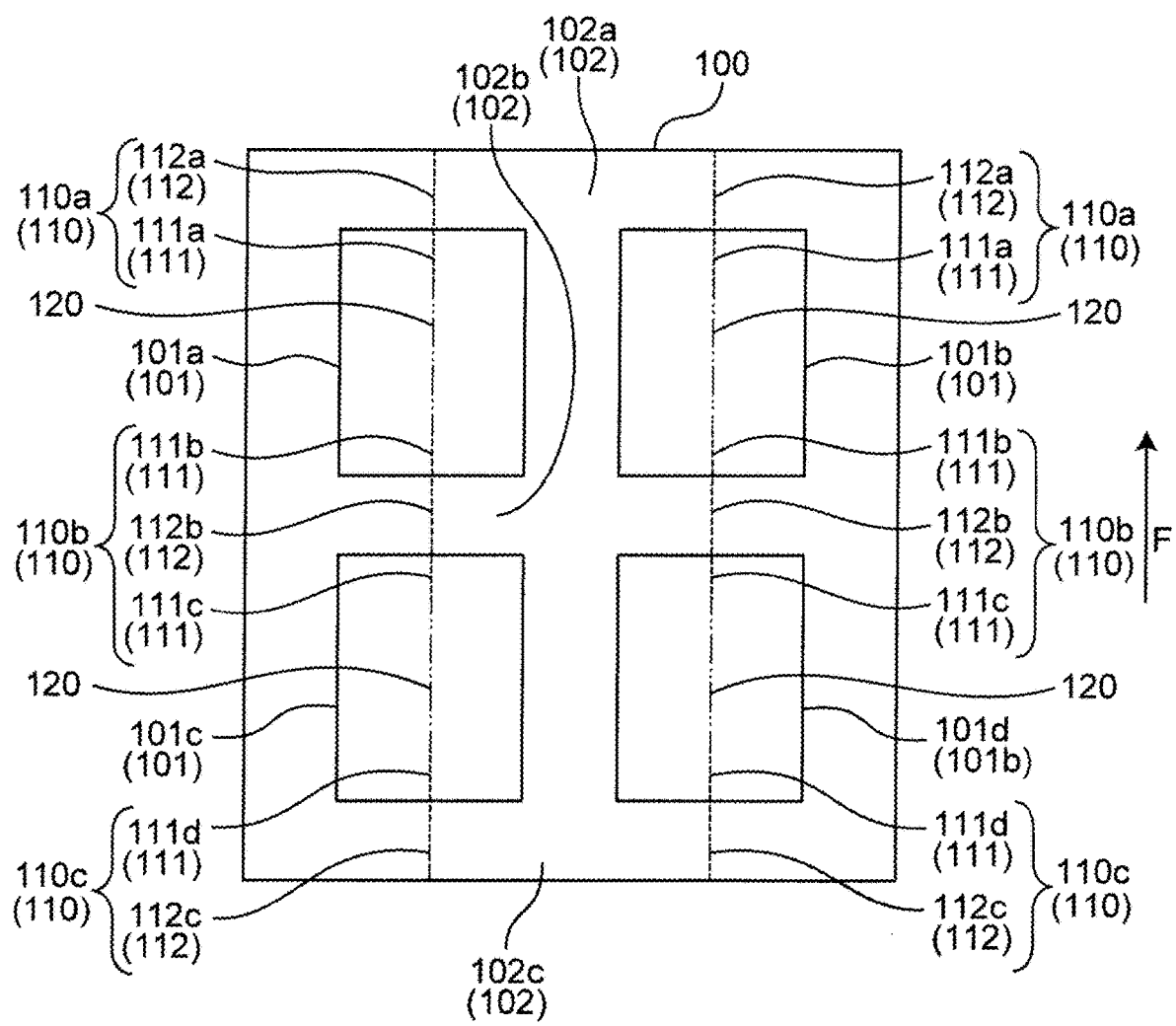
FIG. 3A is a schematic view illustrating an example in which a portion-to-be-processed and a marginal portion-to-be-processed are formed on a sheet having pre-products.

The example of FIG. 3A illustrates the sheet 100 having two pre-products 101a, 101b (101) in the conveyance perpendicular direction, and having pre-products 101c, 101d (101) on the upstream side in the conveyance direction F of the pre-products 101a, 101b (101), respectively. In FIG. 3A, in the pre-products 101a, 101b (101), portions-to-be-processed 111a, 111b (111) extending in the conveyance direction F are formed on the downstream side and upstream side in the conveyance direction F, respectively. The portions-to-be-processed 111a, 111b (111) to be formed in the pre-products 101a, 101b (101) are processed by, for example, the processing tools 20a, 20b of the first processing unit 20 and the processing tools 21a, 21b of the second processing unit 21 illustrated in FIGS. 6A to 6C. These portions-to-be-processed 111a, 111b (111) are, for example, a perforation, slit, folding (crease), half-cut, etc.

In the pre-products 101c, 101d (101), portions-to-be-processed 111c, 111d (111) extending in the conveyance direction F are formed on the downstream side and upstream side in the conveyance direction F, respectively. The portions-to-be-processed 111c, 111d (111) to be formed respectively in the pre-products 101c, 101d (101) are processed by, for example, the processing tools 20a, 20b of the first processing unit 20 and the processing tools 21a, 21b of the second processing unit 21 illustrated in FIGS. 6A to 6C. These portions-to-be-processed 111c, 111d (111) are, for example, a perforation, slit, folding (crease), half-cut, etc.

A front margin 102a is arranged ahead of the front pre-products 101a, 101b (101). A middle margin 102b (102) is arranged between the pre-products 101a, 101c adjacent in the conveyance direction F and between the pre-products 101b, 101d adjacent in the conveyance direction F. A rear margin 102c (102) is arranged behind the rear pre-products 101c, 101d (101). When the portions-to-be-processed 111b, 111c (111) to be formed on the downstream side and upstream side in the conveyance direction F with the middle margin 102b (102) being interposed therebetween are to be processed in the same way, an operation parameter is set such that a marginal portion-to-be-processed 112b (112), which is to be processed in the same way as the portions-to-be-processed 111b, 111c (111), is formed in the middle margin 102b (102).

That is, the operation parameter is set such that: the portion-to-be-processed 111b (111) to be formed in each of the pre-products 101a, 101b (101), the marginal portion-to-be-processed 112b (112) to be formed in the middle margin 102b (102), and the portion-to-be-processed 111c (111) to be formed in each of the pre-products 101c, 101d (101) are to be processed in the same way; and they extend integrally and continuously in the conveyance direction F. Thereby, a continuous portion-to-be-processed 110b (110) is formed through the portion-to-be-processed 111b (111), the marginal portion-to-be-processed 112b (112), and the portion-to-be-processed 111c (111). The continuous portion-to-be-processed 110b (110) extends linearly in the conveyance direction F.

An operation parameter is set such that a marginal portion-to-be-processed 112a (112), which is to be processed in the same way as the portion-to-be-processed 111a (111) to be formed respectively in the front pre-products 101a, 101b (101), is formed in the front margin 102a (102). That is, the operation parameter is set such that: the portion-to-be-processed 111a to be formed in the front pre-products 101a, 101b (101) and the marginal portion-to-be-processed 112a (112) to be formed in the front margin 102a (102) are to be processed in the same way; and they extend integrally and continuously in the conveyance direction F. Thereby, a continuous portion-to-be-processed 110a (110) is formed through the portion-to-be-processed 111a (111) and the marginal portion-to-be-processed 112a (112). The continuous portion-to-be-processed 110a (110) extends linearly in the conveyance direction F.

An operation parameter is set such that: a marginal portion-to-be-processed 112c (112), which is to be processed in the same way as the portion-to-be-processed 111d (111) to be formed in each of the rear pre-products 101c, 101d (101), is formed in the rear margin 102c (102). That is, the operation parameter is set such that: the portion-to-be-processed 111d (111) to be formed in the rear pre-products 101c, 101d (101) and the marginal portion-to-be-processed 112c (112) to be formed in the rear margin 102c (102) are to be processed in the same way; and they extend integrally and continuously in the conveyance direction F. Thereby, a continuous portion-to-be-processed 110c (110) is formed through the portion-to-be-processed 111d (111) and the marginal portion-to-be-processed 112c (112). The continuous portion-to-be-processed 110c (110) extends linearly in the conveyance direction F.

For example, with the portion-to-be-processed 111b (111), the marginal portion-to-be-processed 112b (112), and the portion-to-be-processed 111c (111) formed continuously, as described above, a lifting operation time of the processing tool and the time to stop and restart the conveyance of the sheet 100 can be omitted; and hence a moving time of the processing tool is shortened, and the time required for processing can be minimized. Further, the length-to-be-processed of the continuous portion-to-be-processed 110a (110), including the portion-to-be-processed 111b (111), the marginal portion-to-be-processed 112b (112), and the portion-to-be-processed 111c (111), is minimized by extending linearly in the conveyance direction F, and hence the time required for processing can be minimized. The same applies to the continuous portions-to-be-processed 110a, 110c (110).

In the example of FIG. 3A, it is controlled such that the processing tool holds the processable state (i.e., performs a processable state holding process), even when the processing tool is located in each of the margins 102a, 102b, 102c (102). In the processable state holding process, for example, when a certain portion-to-be-processed (upstream side portion-to-be-processed) 111b (111) is formed in certain pre-products (front pre-products) 101a, 101b (101) and then the next portion-to-be-processed (downstream side portion-to-be-processed) 111c (111), which is to be processed in the same way as the certain portion-to-be-processed (upstream side portion-to-be-processed) 111b (111), is formed in the next pre-products (rear pre-products) 101c, 101d (101), it is controlled such that the processing tool holds the processable state. Thereby, it is not necessary for the processing tool to take the two states, including the processable state and the unprocessable state, in the middle margin 102b (102), and the lifting operation time of the processing tool and the time to stop and restart the conveyance of the sheet 100 can be omitted; and hence the time required for processing can be shortened. Herein, the fact that the certain portion-to-be-processed (upstream side portion-to-be-processed) 111b (111) and the next portion-to-be-processed (downstream side portion-to-be-processed) 111c (111) are processed in the same way means that if the certain portion-to-be-processed (upstream side portion-to-be-processed) 111b (111) is a perforated portion, the next portion-to-be-processed (downstream side portion-to-be-processed) 111c (111) is also a perforated portion. The same applies to the margins 102a, 102c (102).

When a plurality of the sheets 100 are continuously processed, the example of FIG. 3A corresponds to the processing for the intermediate sheets 100 excluding the first sheet 100 and the last sheet 100. When, for example, five sheets 100 are continuously processed, the example of FIG. 3A corresponds to the second to fourth sheets 100. It means that the marginal portion-to-be-processed 112c (112) is formed behind the pre-products 101c, 101d (101) in the rear of the first sheet 100, and subsequently the marginal portion-to-be-processed 112a (112) is formed ahead of the pre-products 101a, 101b (101) in front of the second sheet 100. When the processing for the first sheet 100 moves to the processing for the second sheet 100, it is controlled such that the processing tool holds the processable state (i.e., performs the processable state holding process). Thereby, it is not necessary for the processing tool to take the two states, including the processable state and the unprocessable state, in the front margin 102a (102) and the rear margin 102c (102), and the lifting operation time of the processing tool and the time to stop and restart the conveyance of the sheet 100 can be omitted; and hence the time required for processing can be shortened.

The example of FIG. 3B is different from the example of FIG. 3A in that the marginal portion-to-be-processed 112*a* (112) is not formed in the front margin 102*a* (102) and the marginal portion-to-be-processed 112*c* (112) is not formed in the rear margin 102*c* (102). In the example of FIG. 3B, the processing time is longer than in the example of FIG. 3A, but is shorter than the conventional processing time. The example of FIG. 3B has a shorter processing distance than in the example of FIG. 3A, and thus has the effect of extending the life of the processing tool by suppressing the wear of the processing tool.

Figure 3C:
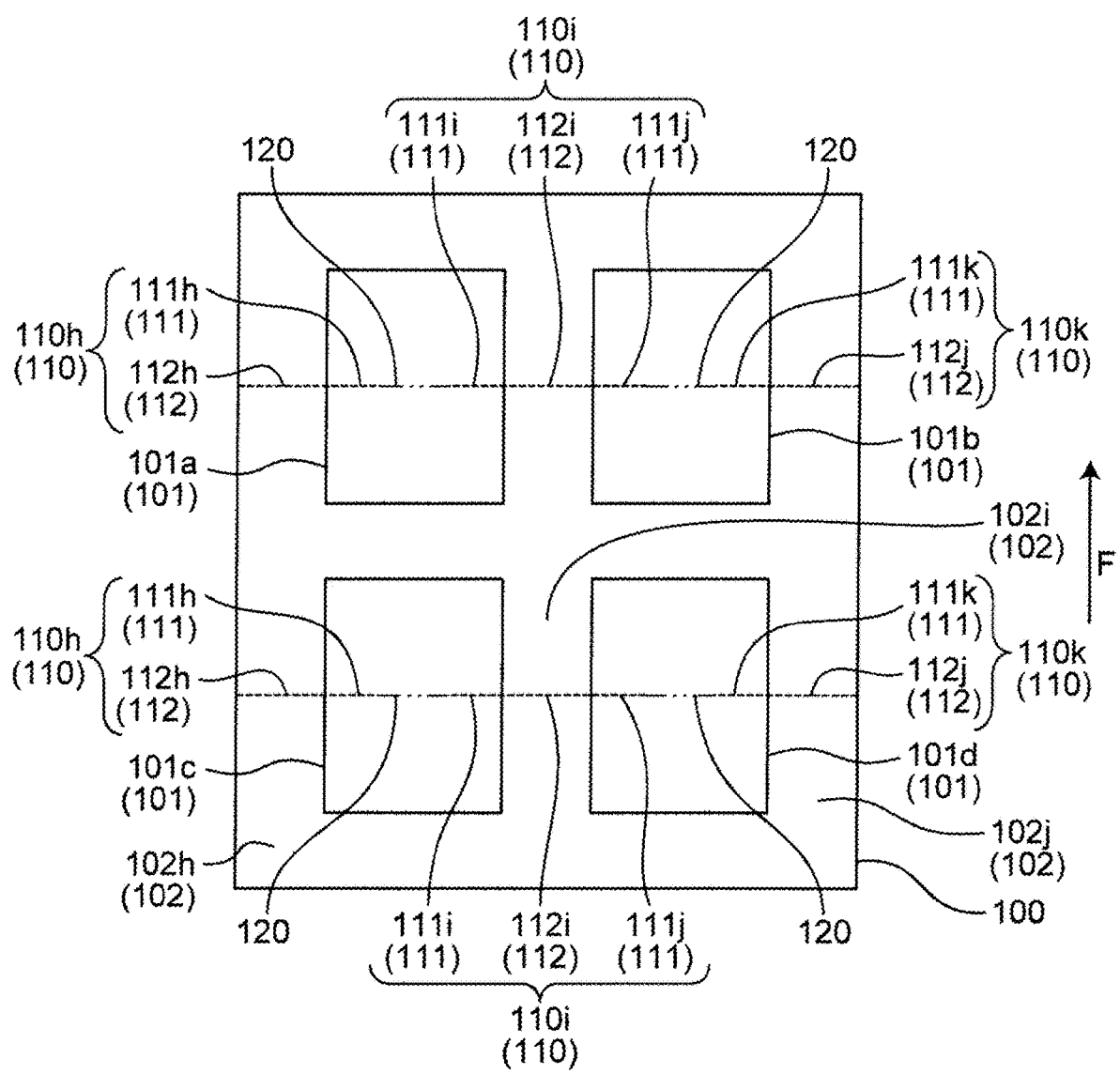
FIG. 3C is a schematic view illustrating an example in which a portion-to-be-processed and a marginal portion-to-be-processed are formed on a sheet having pre-products.

In the example of FIG. 3C, portions-to-be-processed 111*h*, 111*i* (111) extending along the conveyance perpendicular direction (left-right direction) are formed on the left and right sides in the conveyance perpendicular direction of the pre-products 101*a*, 101*c* (101), respectively, and portions-to-be-processed 111*j*, 111*k* (111) extending along the conveyance perpendicular direction (left-right direction) are formed on the left and right sides in the conveyance perpendicular direction of the pre-products 101*b*, 101*d* (101), respectively. In order to form the portions-to-be-processed 111*h*, 111*i*, 111*j*, 111*k* (111) along the conveyance perpendicular direction, the processing tool moves in the conveyance perpendicular direction (left-right direction) in a state in which the conveyance is stopped.

A left margin 102*h* (102) is arranged on the left of the left pre-products 101*a*, 101*c* (101). A middle margin 102*i* (102) is arranged between the pre-products 101*a*, 101*c* (101) and the pre-products 101*b*, 101*d* (101), which are adjacent in the conveyance perpendicular direction. A right margin 102*j* (102) is arranged on the right of the right pre-products 101*b*, 101*d* (101). When the portions-to-be-processed 111*i*, 111*j* (111), which are to be formed on the left and right sides in the conveyance perpendicular direction with the middle margin 102*i* (102) being interposed therebetween, are to be processed in the same way, an operation parameter is set such that a marginal portion-to-be-processed 112*i* (112), which is to be processed in the same way as the portions-to-be-processed 111*i*, 111*j* (111), is formed in the middle margin 102*i* (102).

That is, the operation parameter is set such that: the portion-to-be-processed 111*i*(111) to be formed in each of the pre-products 101*a*, 101*c* (101), the marginal portion-to-be-processed 112*i* (112) to be formed in the middle margin 102*i* (102), and the portion-to-be-processed 111*j* (111) to be formed in each of the pre-products 101*b*, 101*d* (101), are to be processed in the same way; and they extend integrally and continuously in the conveyance perpendicular direction. Thereby, a continuous portion-to-be-processed 110*i* (110) is formed through the portion-to-be-processed 111*i* (111), the marginal portion-to-be-processed 112*i* (112), and the portion-to-be-processed 111*j* (111). The continuous portion-to-be-processed 110*i* (110) extends linearly in the conveyance perpendicular direction.

An operation parameter is set such that a marginal portion-to-be-processed 112*h* (112), which is to be processed in the same way as the portion-to-be-processed 111*h* (111) to be formed in each of the left pre-products 101*a*, 101*c* (101), is formed in the left margin 102*h* (102). That is, the operation parameter is set such that: the portion-to-be-processed 111*h* (111) to be formed in the left pre-products 101*a*, 101*c* (101) and the marginal portion-to-be-processed 112*h* (112) to be formed in the left margin 102*h* (102) are to be processed in the same way; and they extend integrally and continuously in the conveyance perpendicular direction. Thereby, a continuous portion-to-be-processed 110*h* (110) is formed through the portion-to-be-processed 111*h* (111) and the marginal portion-to-be-processed 112*h* (112). The continuous portion-to-be-processed 110*h* (110) extends linearly in the conveyance perpendicular direction.

An operation parameter is set such that: a marginal portion-to-be-processed 112*j* (112), which is to be processed in the same way as the portion-to-be-processed 111*k* (111) to be formed in each of the right pre-products 101*b*, 101*d* (101), is formed in the right margin 102*j* (102). That is, the operation parameter is set such that: the portion-to-be-processed 111*k* (111) to be formed in the right pre-products 101*b*, 101*d* (101) and the marginal portion-to-be-processed 112*j* (112) to be formed in the right margin 102*j* (102) are to be processed in the same way; and they extend integrally and continuously in the conveyance perpendicular direction. Thereby, a continuous portion-to-be-processed 110*k* (110) is formed through the portion-to-be-processed 111*k* (111) and the marginal portion-to-be-processed 112*j* (112). The continuous portion-to-be-processed 110*k* (110) extends linearly in the conveyance perpendicular direction.

For example, with the portion-to-be-processed 111*i*(111), the marginal portion-to-be-processed 112*i* (112), and the portion-to-be-processed 111*j* (111) formed continuously, as described above, the lifting operation time of the processing tool and the time to stop and restart the conveyance of the sheet 100 can be omitted; and hence the time required for processing can be minimized. Further, the length-to-be-processed of the continuous portion-to-be-processed 110*i* (110), including the portion-to-be-processed 111*i* (111), the marginal portion-to-be-processed 112*i* (112), and the portion-to-be-processed 111*j* (111), is minimized by extending linearly in the conveyance perpendicular direction, and hence the time required for processing can be minimized. The same applies to the continuous portions-to-be-processed 110*h*, 110*k* (110).

In the example of FIG. 3C, it is controlled such that the processing tool holds the processable state (i.e., performs the processable state holding process), even when the processing tool is located in each of the margins 102*h*, 102*i*, 102*j* (102). In the processable state holding process, for example, when a certain portion-to-be-processed (right side portion-to-be-processed) 111*i* (111) is formed in certain pre-products (left pre-products) 101*a*, 101*c* (101) and then the next portion-to-be-processed (left side portion-to-be-processed) 111*j* (111), which is to be processed in the same way as the certain portion-to-be-processed (right side portion-to-be-processed) 111*i* (111), is formed in the next pre-products (right pre-products) 101*b*, 101*d* (101), it is controlled such that the processing tool holds the processable state. Thereby, it is not necessary for the processing tool to take the two states, including the unprocessable state and the processable state, in the middle margin 102*i* (102), and the lifting operation time of the processing tool and the time to stop and restart the conveyance of the sheet 100 can be omitted; and hence the time required for processing can be shortened. Herein, the fact that the certain portion-to-be-processed (right side portion-to-be-processed) 111*i* (111) and the next portion-to-be-processed (left side portion-to-be-processed) 111*j* (111) are to be processed in the same way means that if the certain portion-to-be-processed (right side portion-to-be-processed) 111*i* (111) is a perforated portion, the next portion-to-be-processed (left side portion-to-be-processed) 111*j* (111) is also a perforated portion. The same applies to the margins 102*h*, 102*j* (102).

Figure 4A:
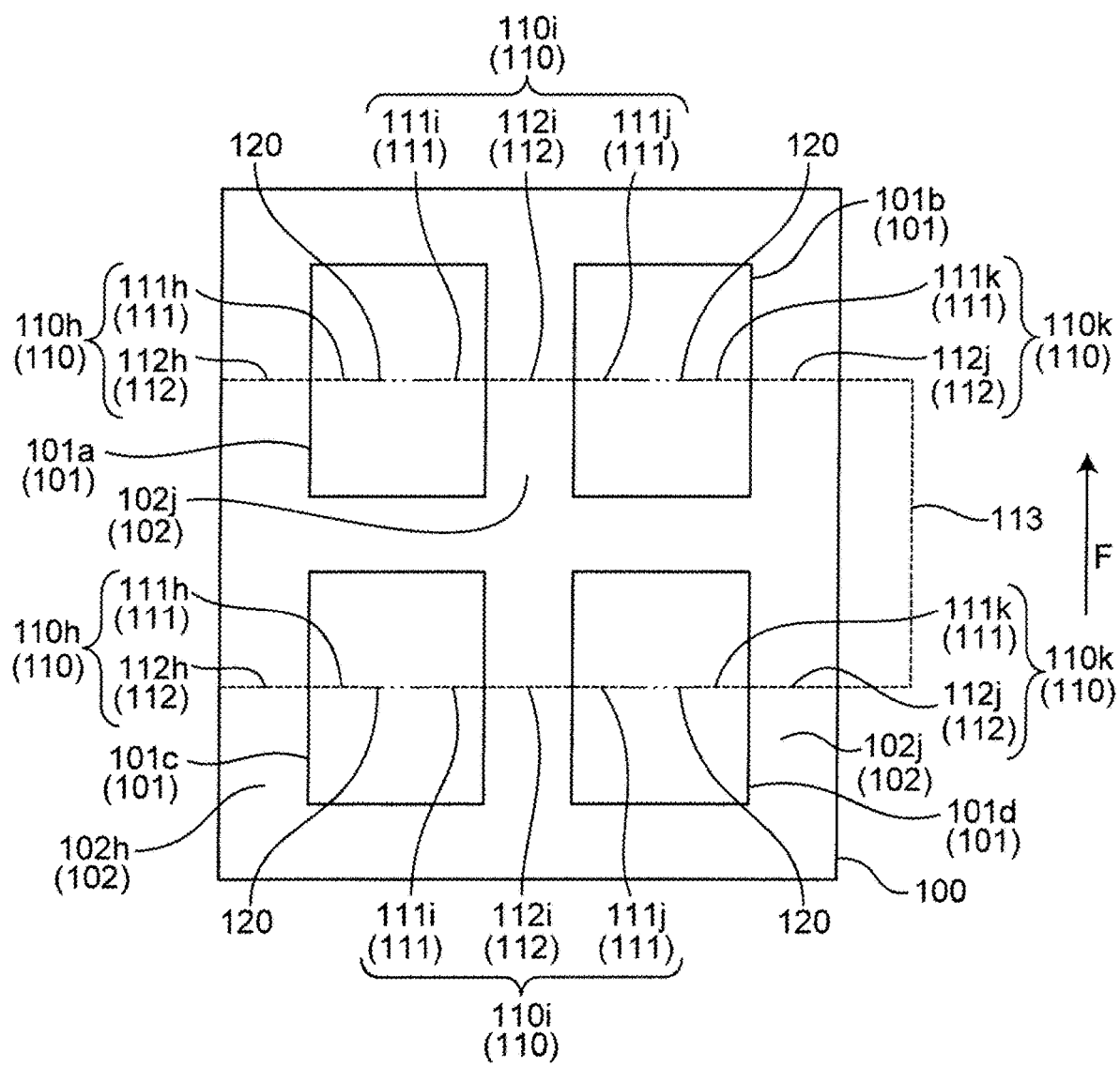
FIG. 4A is a schematic view illustrating an example in which a portion-to-be-processed and a marginal portion-to-be-processed are formed on a sheet having pre-products.

In the example of FIG. 4A, an operation parameter is set such that: in comparison with the example of FIG. 3C, the left front marginal portion-to-be-processed 112*h* (112) located on the downstream side in the conveyance direction F, the portion-to-be-processed 111*h* (111), the portion-to-be-processed 111*i* (111), the marginal portion-to-be-processed 112*i* (112), the portion-to-be-processed 111*j* (111), the portion-to-be-processed 111*k* (111), and the marginal portion-to-be-processed 112*j* (112) are processed in this order, and after the right front marginal portion-to-be-processed 112*j* (112) located on the downstream side in the conveyance direction F is formed, the right rear marginal portion-to-be-processed 112*j* (112) located on the upstream side in the conveyance direction F is formed, all of which are processed by using one processing tool.

A case is considered in which the pre-product 101*b* (101) located on the downstream side in the conveyance direction F and the next pre-product 101*d* (101) located on the upstream side in the conveyance direction F are processed by using one certain processing tool. When they are processed, for example, from the left to right of the conveyance perpendicular direction, after the right front marginal portion-to-be-processed 112*j* (112) located on the downstream side in the conveyance direction F is formed, the left rear marginal portion-to-be-processed 112*h* (112) located on the upstream side in the conveyance direction F can be formed. At this time, the processing tool is moved from the right front to left rear in the unprocessable state, so it takes time to move the processing tool, and hence the time required for processing becomes longer.

Therefore, an operation parameter is set such that after the right front marginal portion-to-be-processed 112*j* (112) located on the downstream side in the conveyance direction F is formed, the right rear marginal portion-to-be-processed 112*j* (112) located on the upstream side in the conveyance direction F is formed. At this time, the processing tool moves relatively with respect to the sheet 100 so as to draw, in planar view, an inverted C-shaped trajectory including a trajectory to the right side of the conveyance perpendicular direction, a trajectory to the upstream side in the conveyance direction F, and a trajectory to the left side of the conveyance perpendicular direction. At the time of the movement, the processing tool is located on the right outside of the sheet 100 in the processable state. Thereby, an outside margin portion-to-be-processed 113 is formed outside the sheet 100. In the example of FIG. 4A, the outside margin portion-to-be-processed 113 is illustrated as being formed in an inverted C shape outside the sheet 100, but one certain processing tool is located outside the sheet 100, and hence nothing is realistically formed on the sheet 100. Therefore, the outside margin portion-to-be-processed 113 is virtual. By controlling the processing tool to draw, in planar view, an inverted C-shaped trajectory from the right front marginal portion-to-be-processed 112*j* (112) toward the next right rear marginal portion-to-be-processed 112*j* (112) in the processable state, the moving distance of the processing tool is shortened and the reverse movement of the processing tool becomes easy, and hence the time required for processing can be shortened.

The relative movement of the processing tool with respect to the sheet 100 can also be controlled such that: by using one processing tool, the processing tool draws, in planar view, a C-shaped trajectory on the left outside of the sheet 100 in order to form the left rear marginal portion-to-be-processed 112*h* (112) located on the downstream side in the conveyance direction F after the right front marginal portion-to-be-processed 112*j* (112) located on the downstream side in the conveyance direction F, the portion-to-be-processed 111*k* (111), the portion-to-be-processed 111*j* (111), the marginal portion-to-be-processed 112*i* (112), the portion-to-be-processed 111*i* (111), the portion-to-be-processed 111*h* (111), and the marginal portion-to-be-processed 112*h* (112) are processed in this order and then the left front marginal portion-to-be-processed 112*h* (112) located on the downstream side in the conveyance direction F is formed. Also, the relative movement of the processing tool with respect to the sheet 100 can also be controlled such that: the processing tool draws, in planar view, an inverted C-shaped trajectory on the right outside of the sheet 100; and the processing tool draws, in planar view, a C-shaped trajectory on the left outside of the sheet 100.

Figure 4B:
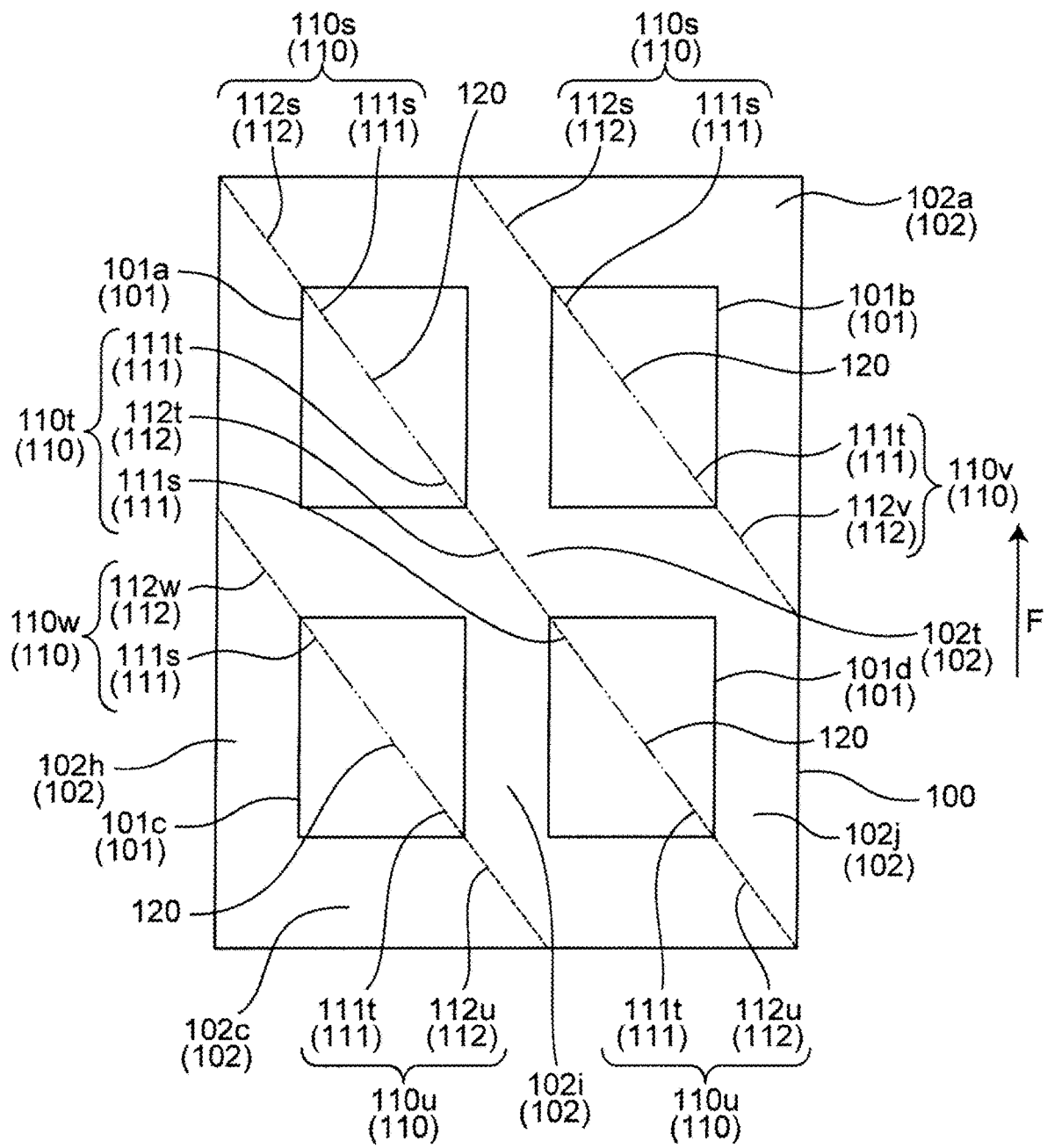
FIG. 4B is a schematic view illustrating an example in which a portion-to-be-processed and a marginal portion-to-be-processed are formed on a sheet having pre-products.

In the example of FIG. 4B, in each of the pre-products 101*a*, 101*b*, 101*c*, 101*d* (101), portions-to-be-processed ills, lilt (111) extending obliquely with respect to the conveyance direction F are formed diagonally on each of the downstream side and upstream side in the conveyance direction F. The portions-to-be-processed 111*s*, 111*t* (111) extending obliquely are formed by controlling the conveyance of the sheet 100 in the conveyance direction F and the movement of the processing tool in the conveyance perpendicular direction to be performed at the same time.

An operation parameter is such that a marginal portion-to-be-processed 112*s* (112), which is to be processed in the same way as the downstream side portions-to-be-processed ills (111) to be formed in each of the front pre-products 101*a*, 101*b* (101), is formed in the front margin 102*a* (102) located ahead of the front pre-products 101*a*, 101*b* (101). That is, the operation parameter is set such that: the downstream side portion-to-be-processed 111*s* (111) to be formed in the front pre-products 101*a*, 101*b* (101) and the marginal portion-to-be-processed 112*s* (112) to be formed in the front margin 102*a* (102) are to be processed in the same way; and they integrally and continuously extend obliquely. Thereby, a continuous portion-to-be-processed 110*s* (110) is formed through the downstream side portion-to-be-processed 111*s* (111) and the marginal portion-to-be-processed 112*s* (112). The continuous portion-to-be-processed 110*s* (110) extends linearly and obliquely with respect to the conveyance direction F.

When the portions-to-be-processed 111*t*, 111*s* (111) to be respectively formed in the pre-products 101*a*, 101*d* (101) located diagonally are to be processed in the same way in a margin 102*t* (102) of an intermediate intersection between the pre-products 101*a*, 101*d* (101), an operation parameter is set such that a marginal portion-to-be-processed 112*t* (112), which is to be processed in the same way as the portions-to-be-processed 111*t*, 111*s* (111) to be respectively formed in the pre-products 101*a*, 101*d* (101), is formed. That is, the operation parameter is set such that: the upstream side portion-to-be-processed 111*t* (111) to be formed in the pre-product 101*a* (101), the marginal portion-to-be-processed 112*t* (112) to be formed in the margin 102*t* (102) of the intermediate intersection, and the downstream side portion-to-be-processed ills (111) to be formed in the pre-product 101*d* (101) are to be processed in the same way; and they integrally and continuously extend obliquely (specifically, diagonally). Thereby, a continuous portion-to-be-processed 110*t* (110) is formed through the upstream side portion-to-be-processed 111*t* (111), the marginal portion-to-be-processed 112*t* (112), and the downstream side portion-to-be-processed 111*s* (111). The continuous portion-to-be-processed 110*t* (110) extends linearly and obliquely with respect to the conveyance direction F.

An operation parameter is set such that a marginal portion-to-be-processed 112w (112), which is to be processed in the same way as the downstream side portion-to-be-processed 111s (111) to be formed in the left rear pre-product 101c (101), is formed in the left margin 102h (102) located on the left side of the left rear pre-product 101c (101). That is, the operation parameter is set such that: the downstream side portion-to-be-processed ills (111) to be formed in the left rear pre-product 101c (101) and the marginal portion-to-be-processed 112w (112) to be formed in the left margin 102h (102) are to be processed in the same way; and they integrally and continuously extend obliquely. Thereby, a continuous portion-to-be-processed 110w (110) is formed through the downstream side portion-to-be-processed ills (111) and the marginal portion-to-be-processed 112w (112). The continuous portion-to-be-processed 110w (110) extends linearly and obliquely with respect to the conveyance direction F.

An operation parameter is set such that a marginal portion-to-be-processed 112v (112), which is to be processed in the same way as the upstream side portion-to-be-processed 111t (111) to be formed in the right front pre-product 101b (101), is formed in the right margin 102j (102) located on the right side of the right front pre-product 101b (101). That is, the operation parameter is set such that: the upstream side portion-to-be-processed 111t (111) to be formed in the right front pre-product 101b (101) and the marginal portion-to-be-processed 112v (112) to be formed in the right margin 102j (102) are to be processed in the same way; and they integrally and continuously extend obliquely. Thereby, a continuous portion-to-be-processed 110v (110) is formed through the upstream side portion-to-be-processed 111t (111) and the marginal portion-to-be-processed 112v (112). The continuous portion-to-be-processed 110v (110) extends linearly and obliquely with respect to the conveyance direction F.

An operation parameter is set such that a marginal portion-to-be-processed 112u (112), which is to be processed in the same way as the portion-to-be-processed 111t (111) to be formed in each of the rear pre-products 101c, 101d (101), is formed in the rear margin 102c (102) located behind the rear pre-products 101c, 101d (101). That is, the operation parameter is set such that: the upstream side portion-to-be-processed 111t (111) to be formed in each of the rear pre-products 101c, 101d (101) and the marginal portion-to-be-processed 112u (112) to be formed in the rear margin 102c (102) are to be processed in the same way; and they integrally and continuously extend obliquely. Thereby, a continuous portion-to-be-processed 110u (110) is formed through the upstream side portion-to-be-processed 111t (111) and the marginal portion-to-be-processed 112u (112). The continuous portion-to-be-processed 110u (110) extends linearly and obliquely with respect to the conveyance direction F.

For example, with the upstream side portion-to-be-processed 111t (111), the marginal portion-to-be-processed 112t (112), and the downstream side portion-to-be-processed 111s (111) formed continuously, as described above, the lifting operation time of the processing tool and the time to stop and restart the conveyance of the sheet 100 can be omitted; and hence the time required for processing can be minimized. Further, the length-to-be-processed of the continuous portion-to-be-processed 110t (110), including the upstream side portion-to-be-processed 111t (111), the marginal portion-to-be-processed 112t (112), and the downstream side portion-to-be-processed 111s (111), is minimized by extending linearly and obliquely with respect to the conveyance direction F, and hence the time required for processing can be minimized. The same applies to the continuous portions-to-be-processed 110s, 110v, 110w, 110u (110).

Figure 4C:
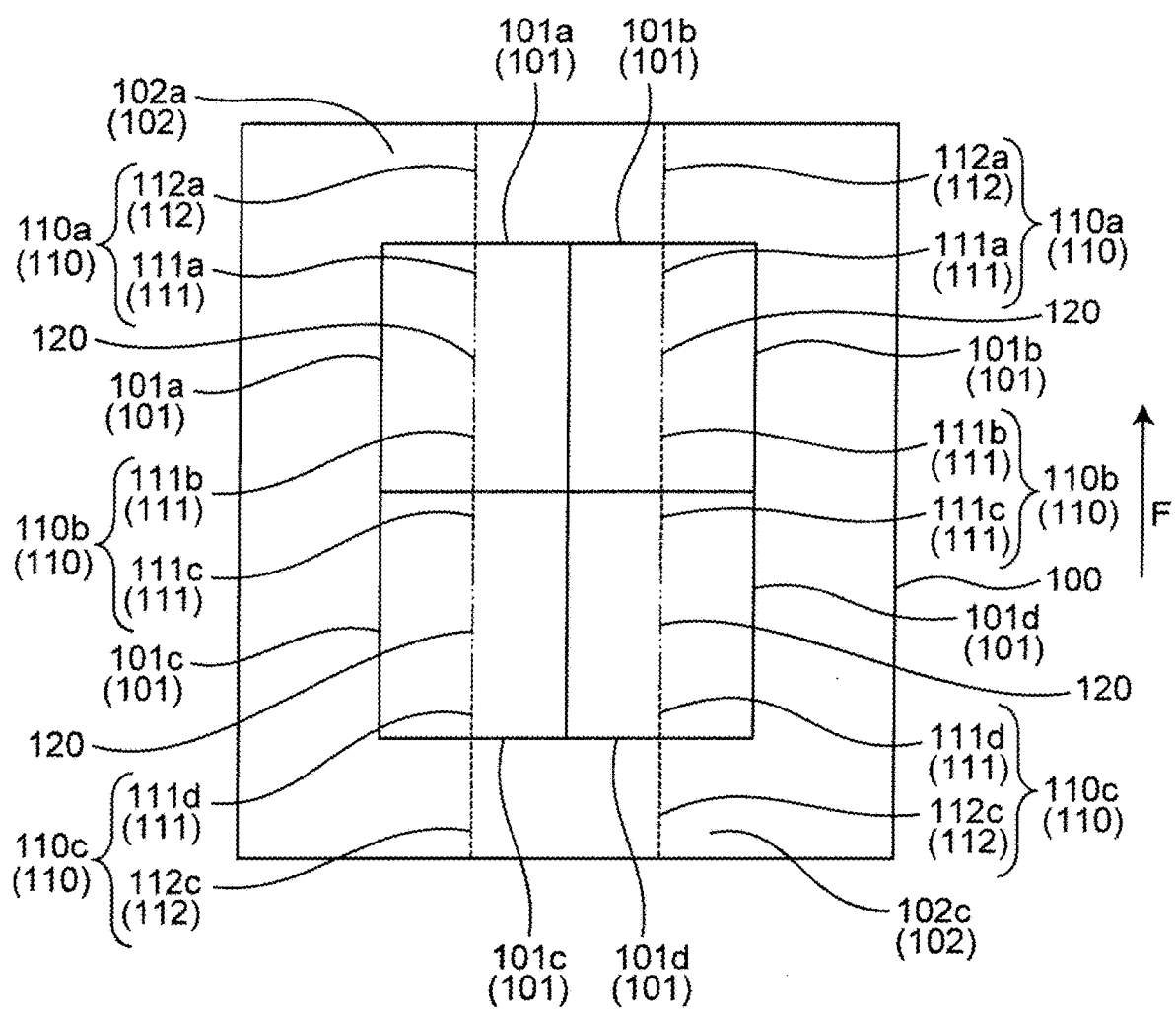
FIG. 4C is a schematic view illustrating an example in which a portion-to-be-processed and a marginal portion-to-be-processed are formed on a sheet having a pre-product.

In the example of FIG. 4C, in comparison with the example of FIG. 3A, the margins 102b, 102i (102) are not provided on the sheet 100 between the pre-products 101a, 101b, 101c, 101d (101) adjacent in the conveyance direction F and the conveyance perpendicular direction. Therefore, an operation parameter is set such that the portion-to-be-processed 111b (111) in the front pre-products 101a, 101b (101) and the portion-to-be-processed 111c (111) in the rear pre-product 101c, 101d (101) are connected and formed.

That is, when the portion-to-be-processed 111b (111) to be formed on the upstream side in the conveyance direction F of the front pre-products 101a, 101b (101) and the portion-to-be-processed 111c (111) to be formed on the downstream side in the conveyance direction F of the rear pre-products 101c, 101d (101) are to be processed in the same way, the operation parameter is set such that the portion-to-be-processed 111b (111) to be formed on the upstream side in the conveyance direction F of the front pre-products 101a, 101b (101) and the portion-to-be-processed 111c (111) to be formed on the downstream side in the conveyance direction F of the rear pre-products 101c, 101d (101) are to be processed in the same way; and they extend integrally and continuously in the conveyance direction F. Thereby, the continuous portion-to-be-processed 110b (110) is formed, where the portion-to-be-processed 111b (111) on the upstream side of the front pre-products 101a, 101b (101) and the portion-to-be-processed 111c (111) on the downstream side of the rear pre-products 101c, 101d (101) are directly connected together. The continuous portion-to-be-processed 110b (110) extends linearly in the conveyance direction F.

The length-to-be-processed of the continuous portion-to-be-processed 110b (110), where the upstream side portion-to-be-processed 111b (111) and the downstream side portion-to-be-processed 111c (111) are connected together, is minimized by extending linearly in the conveyance direction F, and hence the time required for processing can be minimized.

To summarize the above, when a certain portion-to-be-processed 111 is formed in a certain pre-product 101 and then the next portion-to-be-processed 111 of the same type as the certain portion-to-be-processed 111 is formed in the next pre-product 101, the time required for processing can be minimized by holding the processable state. In other words, by forming the marginal portion-to-be-processed 112 in the margin 102, the lifting operation time of the processing tool and the time to stop and restart the conveyance of the sheet 100 can be omitted, and the moving time of the processing tool is shortened; and hence the time required for processing can be minimized.

The margin 102 may be cut off from the sheet 100 before the sheet 100 reaches the processing tool. In this case, various processing, such as perforation processing, is performed on the sheet 100 in a state in which there is no portion to serve as the margin 102. Even in such a case, it is controlled such that the processing tool holds the processable state for a portion corresponding to the margin 102 (i.e., performs the processable state holding process), if the following conditions are satisfied, in which: the portions-to-be-processed 111 in the adjacent pre-products 101 are to be processed in the same way; and the portions-to-be-processed 111 are linear. Thereby, it is not necessary for the processing tool to take the two states, including the unprocessable state and the processable state, in a portion corresponding to the margin 102, and the lifting operation time of the processing tool and the time to stop and restart the conveyance of the sheet 100 can be omitted; and hence the time required for processing can be shortened.

(Example of Processing Tool Selection)

An example of selecting a processing tool will be described with reference to FIGS. 5A to 6C and 14A to 15. In FIGS. 5A to 6C and 14A to 15, black diamonds, circles, and triangles indicate selected processing tools, while white diamonds, circles, and triangles indicate processing tools that are not selected. For example, a diamond-shaped processing tool indicates a corresponding processing tool for perforation processing, a circular processing tool indicates a corresponding processing tool for crease processing, and a triangular processing tool indicates a corresponding processing tool for half-cut. Also, the perforation portion-to-be-processed 111 or continuous portion-to-be-processed 110 is indicated by a broken line, the crease portion-to-be-processed 111 or continuous portion-to-be-processed 110 is indicated by a dashed line, and the half-cut portion-to-be-processed 111 or continuous portion-to-be-processed 110 is indicated by a two-dot chain line.

In FIGS. 5A and 5B, the first processing unit 20 as the processing unit is arranged in a single row in the conveyance direction F.

FIG. 5A illustrates an example of how to select the processing tools 20a, 20b of the first processing unit 20, which are, for example, respectively arranged on the left and right sides in the conveyance perpendicular direction, when two perforation portions-to-be-processed 111 or continuous portions-to-be-processed 110 are formed on the left side in the conveyance perpendicular direction on the sheet 100. The two processing tools 20a, 20b of the first processing unit 20 are corresponding processing tools for vertical perforation processing, and constitute a corresponding processing tool group including a plurality of corresponding processing tools for vertical perforation processing.

Since the two portions-to-be-processed 111 or continuous portions-to-be-processed 110 to be formed are offset to the left in the conveyance perpendicular direction and are shifted in the conveyance direction F, the first processing tool 20a located on the left side in the conveyance perpendicular direction is selected. With the first processing tool 20a located on the left side in the conveyance perpendicular direction moving toward the center (indicated by a broken line in FIG. 5A), the portion-to-be-processed 111 or continuous portion-to-be-processed 110, which is located on the downstream side in the conveyance direction F and located near to the center in the conveyance perpendicular direction, is formed. Thereafter, with the first processing tool 20a moving to the left side in the conveyance perpendicular direction (indicated by a solid line in FIG. 5A), the portion-to-be-processed 111 or continuous portion-to-be-processed 110, which is located on the upstream side in the conveyance direction F and located on the left side in the conveyance perpendicular direction, is formed. According to this configuration, the processing tool 20a, which is optimal for minimizing the moving distance or moving time of a processing tool in the conveyance perpendicular direction, is selected from a plurality of the corresponding processing tools 20a, 20b (i.e., corresponding processing tool group), and hence the time required for processing can be minimized.

FIG. 5B illustrates an example of how to select the processing tools 20a, 20b of the first processing unit 20, which are, for example, respectively arranged on the left and right sides in the conveyance perpendicular direction, when two perforation portions-to-be-processed 111 or continuous portions-to-be-processed 110 are respectively formed on the left and right sides in the conveyance perpendicular direction on the sheet 100. The two processing tools 20a, 20b of the first processing unit 20 are corresponding processing tools for vertical perforation processing, and constitute a corresponding processing tool group including a plurality of corresponding processing tools for vertical perforation processing.

Since the two portions-to-be-processed 111 or continuous portions-to-be-processed 110 to be formed are located on the left and right sides in the conveyance perpendicular direction, respectively, the first processing tool 20a located on the left side in the conveyance perpendicular direction and the second processing tool 20b located on the right side in the conveyance perpendicular direction are selected.

With the second processing tool 20b located on the right side in the conveyance perpendicular direction moving to a position corresponding to the portion-to-be-processed 111 or continuous portion-to-be-processed 110 to be formed, the portion-to-be-processed 111 or continuous portion-to-be-processed 110, which is located on the downstream side in the conveyance direction F and located on the right side in the conveyance perpendicular direction, is formed. With the first processing tool 20a located on the left side in the conveyance perpendicular direction moving to a position corresponding to the portion-to-be-processed 111 or continuous portion-to-be-processed 110 to be formed, the portion-to-be-processed 111 or continuous portion-to-be-processed 110, which is located on the upstream side in the conveyance direction F and located on the left side in the conveyance perpendicular direction, is formed. According to this configuration, the processing tools 20a, 20b, which are optimal for minimizing the moving distance or moving time of a processing tool in the conveyance perpendicular direction, are selected from the plurality of the corresponding processing tools 20a, 20b (i.e., corresponding processing tool group), and hence the time required for processing can be minimized.

In FIGS. 6A to 6C, the first processing unit 20 and the second processing unit 21 as the processing unit are arranged in two rows (i.e., multiple rows) in the conveyance direction F.

FIG. 6A illustrates an example of how to select the processing tools 20a, 20b, 21a, 21b, in a case that the first processing tool 20a of the first processing unit 20 and the third processing tool 21a of the second processing unit 21 are, for example, arranged on the left side in the conveyance perpendicular direction and the second processing tool 20b of the first processing unit 20 and the fourth processing tool 21b of the second processing unit 21 are arranged on the right side in the conveyance perpendicular direction, and two perforation portions-to-be-processed 111 or continuous portions-to-be-processed 110 are formed on the left side in the conveyance perpendicular direction on the sheet 100. The two processing tools 20a, 20b of the first processing unit 20 and the two processing tools 21a, 21b of the second processing unit 21 are corresponding processing tools for vertical perforation processing, and constitutes a corresponding processing tool group including a plurality of the corresponding processing tools for vertical perforation processing.

Since the two portions-to-be-processed 111 or continuous portions-to-be-processed 110 to be formed are offset to the left in the conveyance perpendicular direction and are shifted in the conveyance direction F, the processing tools 20a, 21a, located on the left side in the conveyance perpendicular direction, are selected.

With the third processing tool 21a, located on the left side in the conveyance perpendicular direction at the initial position, moving toward the center, the portion-to-be-processed 111 or continuous portion-to-be-processed 110, which is located on the downstream side in the conveyance direction F and located near to the center in the conveyance perpendicular direction, is formed. With the first processing tool 20a moving to a position corresponding to the portion-to-be-processed 111 or continuous portion-to-be-processed 110 to be formed, the portion-to-be-processed 111 or continuous portion-to-be-processed 110, which is located on the upstream side in the conveyance direction F and located on the left side in the conveyance perpendicular direction, is formed. Therefore, the processing tools 20a, 21a located on the left side in the conveyance perpendicular direction are selected, while the processing tools 20b, 21b located on the right side in the conveyance perpendicular direction are not selected. According to this configuration, the processing tools 20a, 21a, which are optimal for minimizing the moving distance or moving time of a processing tool in the conveyance perpendicular direction, are selected from a plurality of the corresponding processing tools 20a, 20b, 21a, 21b (i.e., corresponding processing tool group), and hence the time required for processing can be minimized. By selecting processing tools in different rows, a processing tool in a row can be moved while another processing tool in another row is performing processing, and hence the total processing time can be shortened. Further, the movements of processing tools in the same row can be prevented from interfering with each other.

FIG. 6B illustrates an example of how to select the processing tools 20a, 20b, 21a, 21b, in a case that the first processing tool 20a of the first processing unit 20 and the third processing tool 21a of the second processing unit 21 are, for example, arranged on the left side in the conveyance perpendicular direction and the second processing tool 20b of the first processing unit 20 and the fourth processing tool 21b of the second processing unit 21 are arranged on the right side in the conveyance perpendicular direction, and two perforation portions-to-be-processed 111 or continuous portions-to-be-processed 110 are formed on the left side in the conveyance perpendicular direction on the sheet 100 and one perforation portion-to-be-processed 111 or continuous portion-to-be-processed 110 is formed on the right side in the conveyance perpendicular direction on the sheet 100. The two processing tools 20a, 20b of the first processing unit 20 and the two processing tools 21a, 21b of the second processing unit 21 are corresponding processing tools for vertical perforation processing, and constitutes a corresponding processing tool group including a plurality of the corresponding processing tools for vertical perforation processing.

Since the two portions-to-be-processed 111 or continuous portions-to-be-processed 110 to be formed are offset to the left side in the conveyance perpendicular direction and are shifted in the conveyance direction F, the processing tools 20a, 21a, located on the left side in the conveyance perpendicular direction, are selected. Since the one portion-to-be-processed 111 or continuous portion-to-be-processed 110 to be formed is offset to the right side in the conveyance perpendicular direction and is shifted in the conveyance direction F, the second processing tool 20b, located on the right side in the conveyance perpendicular direction, is selected. In this case, the fourth processing tool 21b can also be selected, instead of the second processing tool 20b.

With the second processing tool 20b of the first processing unit 20 moving to a position corresponding to the portion-to-be-processed 111 or continuous portion-to-be-processed 110 to be formed, the portion-to-be-processed 111 or continuous portion-to-be-processed 110, which is located on the downstream side in the conveyance direction F and located on the right side in the conveyance perpendicular direction, is formed. With the third processing tool 21a of the second processing unit 21, located on the left side in the conveyance perpendicular direction at the initial position, moving toward the center, the portion-to-be-processed 111 or continuous portion-to-be-processed 110, which is located on the downstream side in the conveyance direction F and located near to the center in the conveyance perpendicular direction, is formed. With the first processing tool 20a of the first processing unit 20 moving to a position corresponding to the portion-to-be-processed 111 or continuous portion-to-be-processed 110 to be formed, the portion-to-be-processed 111 or continuous portion-to-be-processed 110, which is located on the upstream side in the conveyance direction F and located on the left side in the conveyance perpendicular direction, is formed. Therefore, the processing tools 20a, 20b of the first processing unit 20 and the third processing tool 21a of the second processing unit 21 are selected, while the fourth processing tool 21b of the second processing unit 21 is not selected. According to this configuration, the processing tools 20a, 20b, 21a, which are optimal for minimizing the moving distance or moving time of a processing tool in the conveyance perpendicular direction, are selected from the plurality of the corresponding processing tools 20a, 20b, 21a, 21b (i.e., corresponding processing tool group), and hence the time required for processing can be minimized. By selecting processing tools in different rows, a processing tool in a row can be moved while another processing tool in another row is performing processing, and hence the total processing time can be shortened. Further, the movements of processing tools in the same row can be prevented from interfering with each other.

FIG. 6C illustrates an example of how to select the processing tools 20a, 20b, 21a, 21b, in a case that the first processing tool 20a of the first processing unit 20 and the third processing tool 21a of the second processing unit 21 are, for example, arranged on the left side in the conveyance perpendicular direction and the second processing tool 20b of the first processing unit 20 and the fourth processing tool 21b of the second processing unit 21 are arranged on the right side in the conveyance perpendicular direction, and one perforation portion-to-be-processed 111 or continuous portion-to-be-processed 110 is formed on the left side in the conveyance perpendicular direction on the sheet 100 and one perforation portion-to-be-processed 111 or continuous portion-to-be-processed 110 is formed on the right side in the conveyance perpendicular direction on the sheet 100. The two processing tools 20a, 20b of the first processing unit 20 and the two processing tools 21a, 21b of the second processing unit 21 are corresponding processing tools for vertical perforation processing, and constitutes a corresponding processing tool group including a plurality of the corresponding processing tools for vertical perforation processing.

Since the one portion-to-be-processed 111 or continuous portion-to-be-processed 110 to be formed is located on the left side in the conveyance perpendicular direction and located on the upstream side in the conveyance direction F, the first processing tool 20a, located on the left side in the conveyance perpendicular direction, is selected. Since the one portion-to-be-processed 111 or continuous portion-tobe-processed 110 to be formed is located on the right side in the conveyance perpendicular direction and located on the downstream side in the conveyance direction F, the second processing tool 20b, located on the right side in the conveyance perpendicular direction, is selected. Herein, the third processing tool 21a can also be selected, instead of the first processing tool 20a. The fourth processing tool 21b can also be selected, instead of the second processing tool 20b.

With the second processing tool 20b of the first processing unit 20 moving to a position corresponding to the portion-to-be-processed 111 or continuous portion-to-be-processed 110 to be formed, the portion-to-be-processed 111 or continuous portion-to-be-processed 110, which is located on the downstream side in the conveyance direction F and located on the right side in the conveyance perpendicular direction, is formed. With the first processing tool 20a of the first processing unit 20 moving to a position corresponding to the portion-to-be-processed 111 or continuous portion-to-be-processed 110 to be formed, the portion-to-be-processed 111 or continuous portion-to-be-processed 110, which is located on the upstream side in the conveyance direction F and located on the left side in the conveyance perpendicular direction, is formed. Therefore, the processing tools 20a, 20b of the first processing unit 20 are selected, while the processing tools 21a, 21b of the second processing unit 21 are not selected. According to this configuration, the processing tools 20a, 20b, which are optimal for minimizing the moving distance or moving time of a processing tool in the conveyance perpendicular direction, are selected from the plurality of the corresponding processing tools 20a, 20b, 21a, 21b (i.e., corresponding processing tool group), and hence the time required for processing can be minimized.

Figure 14A:
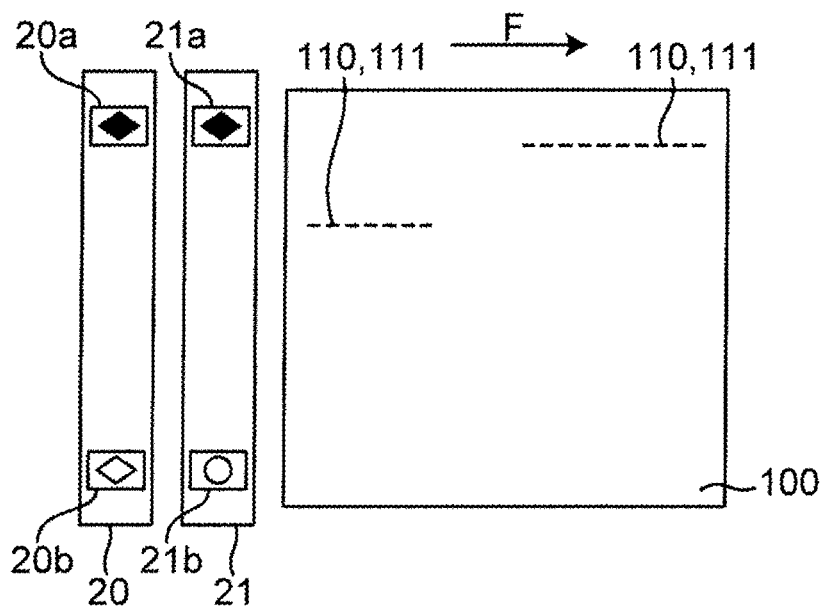
FIGS. 14A and 14B are schematic views each illustrating another example in which a processing tool is selected.
Figure 14B:
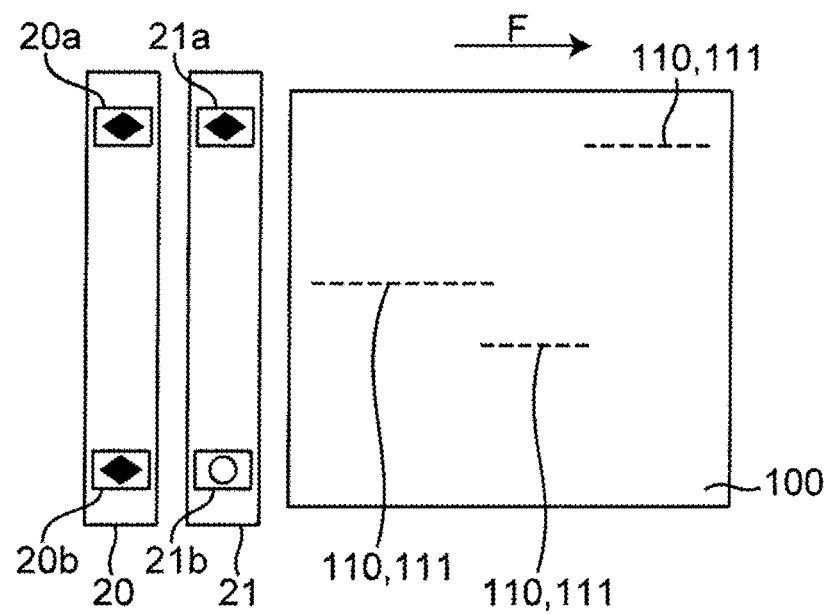

In FIGS. 14A and 14B, the first processing unit 20 and the second processing unit 21 as the processing unit are arranged in two rows (i.e., multiple rows) in the conveyance direction F.

FIG. 14A illustrates an example of how to select the processing tools 20a, 20b, 21a, in a case that the first processing tool 20a of the first processing unit 20 and the third processing tool 21a of the second processing unit 21 are, for example, arranged on the left side in the conveyance perpendicular direction and the second processing tool 20b of the first processing unit 20 is arranged on the right side in the conveyance perpendicular direction, and two perforation portions-to-be-processed 111 or continuous portions-to-be-processed 110 are formed on the left side in the conveyance perpendicular direction on the sheet 100. The two processing tools 20a, 20b of the first processing unit 20 and one third processing tool 21a of the second processing unit 21 are corresponding processing tools for vertical perforation processing, and constitutes a corresponding processing tool group including a plurality of the corresponding processing tools for vertical perforation processing. In the second processing unit 21, one fourth processing tool 21b arranged on the right side in the conveyance perpendicular direction is a corresponding processing tool for vertical crease processing, and is a processing tool of different type from the processing tools 20a, 20b, 21a.

Since the two portions-to-be-processed 111 or continuous portions-to-be-processed 110 to be formed are offset to the left in the conveyance perpendicular direction and are shifted in the conveyance direction F, the processing tools 20a, 21a, located on the left side in the conveyance perpendicular direction, are selected.

With the third processing tool 21a, located on the left side in the conveyance perpendicular direction at the initial position, moving to a position corresponding to the portion-to-be-processed 111 or continuous portion-to-be-processed 110 to be formed, the portion-to-be-processed 111 or continuous portion-to-be-processed 110, which is located on the downstream side in the conveyance direction F and located on the left side in the conveyance perpendicular direction, is formed. With the first processing tool 20a moving toward the center in the conveyance perpendicular direction, the portion-to-be-processed 111 or continuous portion-to-be-processed 110, which is located on the upstream side in the conveyance direction F and located on the left side in the conveyance perpendicular direction, is formed. According to this configuration, the processing tools 20a, 21a, which are optimal for minimizing the moving distance or moving time of a processing tool in the conveyance perpendicular direction, are selected from a plurality of the corresponding processing tools 20a, 20b, 21a, 21b (i.e., corresponding processing tool group), and hence the time required for processing can be minimized. Therefore, the processing tools 20a, 21a, located on the left side in the conveyance perpendicular direction, are selected. Herein, it is also possible to select only the first processing tool 20a or the third processing tool 21a (combination I). Alternatively, it is also possible to select only the processing tools 20a, 20b (combination II). Alternatively, it is also possible to select only the processing tools 20b, 21a (combination III). The above combination I, combination II, and combination III are less effective than the case where the processing tools 20a, 21a are selected, but are more effective than before.

FIG. 14B illustrates an example of how to select the processing tools 20a, 20b, 21a, in a case that the first processing tool 20a of the first processing unit 20 and the third processing tool 21a of the second processing unit 21 are, for example, arranged on the left side in the conveyance perpendicular direction and the second processing tool 20b of the first processing unit 20 is arranged on the right side in the conveyance perpendicular direction, and one perforation portions-to-be-processed 111 or continuous portions-to-be-processed 110 are respectively formed on the left side, in a portion near to the center, and on the right side in the conveyance perpendicular direction on the sheet 100. The two processing tools 20a, 20b of the first processing unit 20 and the one third processing tool 21a of the second processing unit 21 constitute a corresponding processing tool group including a plurality of the corresponding processing tools for vertical perforation processing. In the second processing unit 21, the fourth processing tool 21b arranged on the right side in the conveyance perpendicular direction is a corresponding processing tool for vertical crease processing, and is a processing tool of different type from the processing tools 20a, 20b, 21a.

Since the two portions-to-be-processed 111 or continuous portions-to-be-processed 110 to be formed are offset to the left side in the conveyance perpendicular direction and are shifted in the conveyance direction F, the processing tools 20a, 21a, located on the left side in the conveyance perpendicular direction, are selected. Since the one portion-to-be-processed 111 or continuous portion-to-be-processed 110 to be formed is offset to the right side in the conveyance perpendicular direction and is shifted in the conveyance direction F, the second processing tool 20b, located on the right side in the conveyance perpendicular direction, is selected. That is, three processing tools 20a, 20b, 21a are selected.

By selecting processing tools in different rows, a processing tool in a row can be moved while another processing tool in another row is performing processing, and hence the total processing time can be shortened. Further, the movements of processing tools in the same row can be prevented from interfering with each other. Therefore, the processing tools 20a, 20b, 21a, which are optimal for minimizing the moving distance or moving time of a processing tool, are selected from a plurality of the corresponding processing tools 20a, 20b, 21a (i.e., corresponding processing tool group), and hence the time required for processing can be minimized. Herein, it is also possible to select only the processing tools 20a, 21a (combination IV). Alternatively, it is also possible to select only the processing tools 20b, 21a (combination V). Alternatively, it is also possible to select only the processing tools 20a, 20b (combination VI). The above combination IV, combination V, and combination VI are less effective than the case where the processing tools 20a, 20b, 21a are selected, but are more effective than before.

In FIG. 15, the first processing unit 20, the second processing unit 21, a third processing unit 22, and a fourth processing unit 23 as the processing unit are arranged in four rows (i.e., multiple rows) in the conveyance direction F.

FIG. 15 illustrates an example of how to select the processing tools 20a, 20b, 21a, 21b, 22a, 22b, 23a, 23b when a plurality of types of corresponding processing tool groups are arranged in multiple rows in the conveyance direction. The two processing tools 20a, 20b of the first processing unit 20 and one third processing tool 21a of the second processing unit 21 are corresponding processing tools for vertical perforation processing, and constitutes a corresponding processing tool group including a plurality of the corresponding processing tools for vertical perforation processing. One fourth processing tool 21b of the second processing unit 21, one fifth processing tool 22a of the third processing unit 22, and one seventh processing tool 23a of the fourth processing unit 23 are corresponding processing tools for vertical crease processing, and constitutes a corresponding processing tool group including a plurality of the corresponding processing tools for vertical crease processing. One sixth processing tool 22b of the third processing unit 22 and one eighth processing tool 23b of the fourth processing unit 23 are corresponding processing tools for vertical half-cut processing, and constitutes a corresponding processing tool group including a plurality of the corresponding processing tools for vertical half-cut processing. Therefore, the processing tools 20a, 20b, 21a, the processing tools 21b, 22a, 23a, and the processing tools 22b, 23b constitute different types of corresponding processing tool groups.

FIG. 15 illustrates an example of how to select the processing tools 20a, 20b, 21a, in a case that the first processing tool 20a of the first processing unit 20 and the third processing tool 21a of the second processing unit 21 are, for example, arranged on the left side in the conveyance perpendicular direction and the second processing tool 20b of the first processing unit 20 is arranged on the right side in the conveyance perpendicular direction, and one perforation portions-to-be-processed 111 or continuous portions-to-be-processed 110 are respectively formed on the left side, in a portion near to the center, and on the right side in the conveyance perpendicular direction on the sheet 100. The relationship between the arrangement of the processing tools 20a, 20b, and 21a and the three portions-to-be-processed 111 or continuous portions-to-be-processed 110 to be formed is substantially the same as that in FIG. 14B, and hence description thereof will be omitted.

FIG. 15 also illustrates an example of how to select the processing tools 21b, 22a, 23a, in a case that the processing tools 22a, 23a are, for example, arranged on the left side in the conveyance perpendicular direction, the fourth processing tool 21b is arranged on the right side in the conveyance perpendicular direction, one crease portion-to-be-processed 111 or continuous portions-to-be-processed 110 is formed on the left side in the conveyance perpendicular direction on the sheet 100, and one crease portion-to-be-processed 111 or continuous portions-to-be-processed 110 is formed on the right side in the conveyance perpendicular direction on the sheet 100. Since the one portion-to-be-processed 111 or continuous portion-to-be-processed 110 to be formed is located on the left side in the conveyance perpendicular direction and located on the upstream side in the conveyance direction F, the fifth processing tool 22a, located on the left side in the conveyance perpendicular direction, is selected. Since the one portion-to-be-processed 111 or continuous portion-to-be-processed 110 to be formed is located on the right side in the conveyance perpendicular direction and located on the downstream side in the conveyance direction F, the fourth processing tool 21b, located on the right side in the conveyance perpendicular direction, is selected. Therefore, the processing tools 21b and 22a are selected. According to this configuration, the processing tools 21b, 22a, which are optimal for minimizing the moving distance or moving time of a processing tool, are selected from a plurality of the corresponding processing tools 21b, 22a, 23a (i.e., corresponding processing tool group), and hence the time required for processing can be minimized. Even when the seventh processing tool 23a is selected instead of the fifth processing tool 22a, the moving distance or moving time is substantially the same as when the fifth processing tool 22a is selected; and hence the seventh processing tool 23a can also be selected instead of the fifth processing tool 22a. Alternatively, it is also possible to select only the processing tools 22a, 23a (combination VII). The above combination VII is less effective than the case where the processing tools 21b, 22a are selected, but is more effective than before.

FIG. 15 also illustrates an example of how to select the processing tools 22b, 23b, in a case that the processing tools 22b, 23b are, for example, arranged on the right side in the conveyance perpendicular direction, and one half-cut portions-to-be-processed 111 or continuous portions-to-be-processed 110 are formed on the left side, in a portion near to the center, and on the right side in the conveyance perpendicular direction, respectively. To process one portion-to-be-processed 111 or continuous portion-to-be-processed 110 to be formed first, the eighth processing tool 23b is selected to perform processing. Then, the sixth processing tool 22b is selected while the processing by the eighth processing tool 23b is being performed, and the sixth processing tool 22b moves to the left side in the conveyance perpendicular direction and performs processing on the corresponding portion by the time the processing by the eighth processing tool 23b is completed. Further, the eighth processing tool 23b is selected while the processing by the sixth processing tool 22b is being performed, and the eighth processing tool 23b moves to the right side in the conveyance perpendicular direction and performs processing on the corresponding portion by the time the processing by the sixth processing tool 22b is completed. According to this configuration, the processing tools 22b, 23b, which are optimal for minimizing the moving distance or moving time of a processing tool, are selected from a plurality of the corresponding processing tools 22b, 23b (i.e., corresponding processing tool group), and hence the time required for processing can be minimized. Further, the sixth processing tool 22b can move to a predetermined position in parallel with the processing operation of the eighth processing tool 23b (i.e., while the eighth processing tool 23b is processing), and the eighth processing tool 23b can move to a predetermined position in parallel with the processing operation of the sixth processing tool 22b (i.e., while the sixth processing tool 22b is processing); and hence the total processing time can be shortened.

(Information Input Operation)

An example of an input operation for setting an operation parameter will be described with reference to FIGS. 7 to 9.

Figure 7:
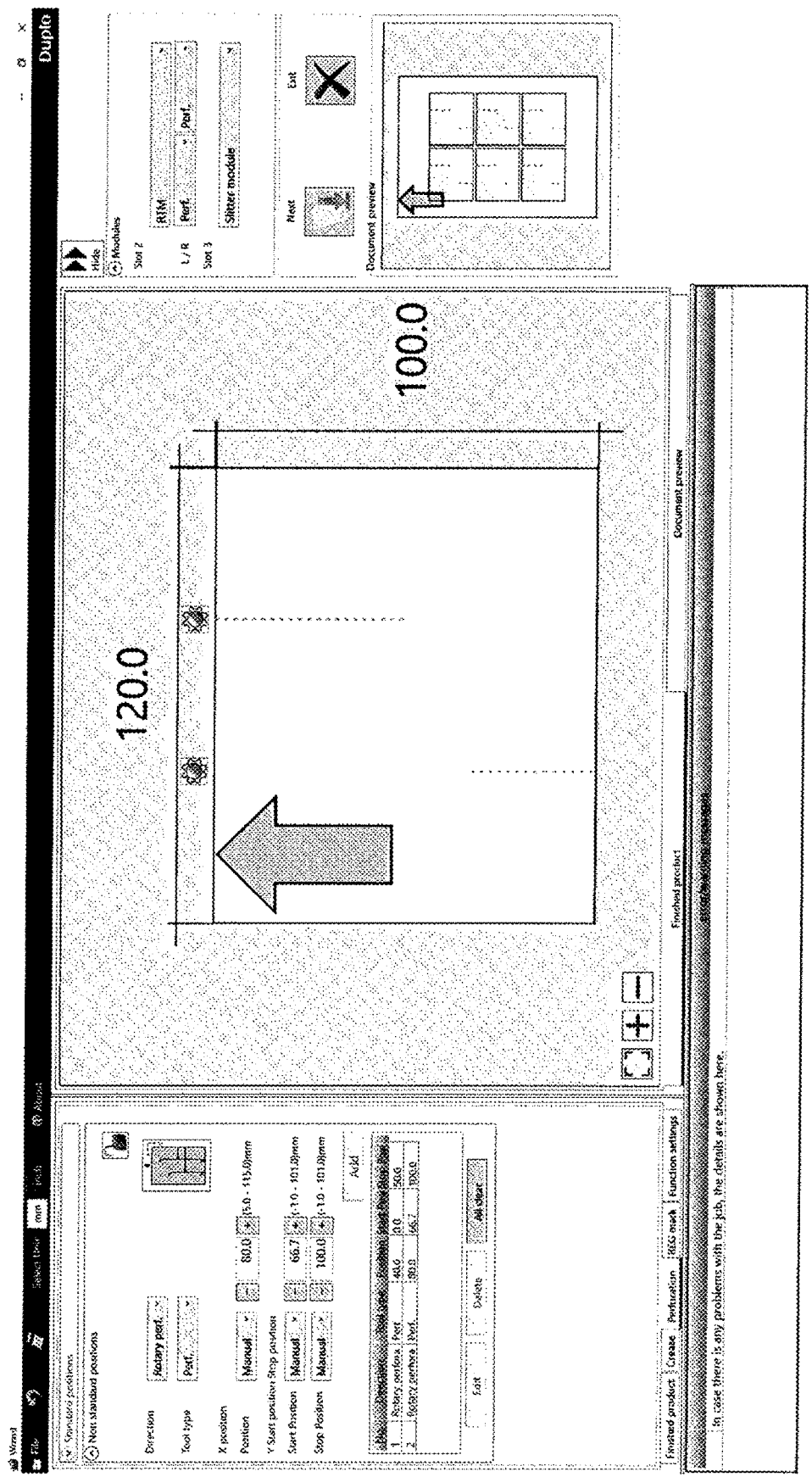
FIG. 7 is a view illustrating an example of an input screen when an operation parameter is set.
Figure 8:
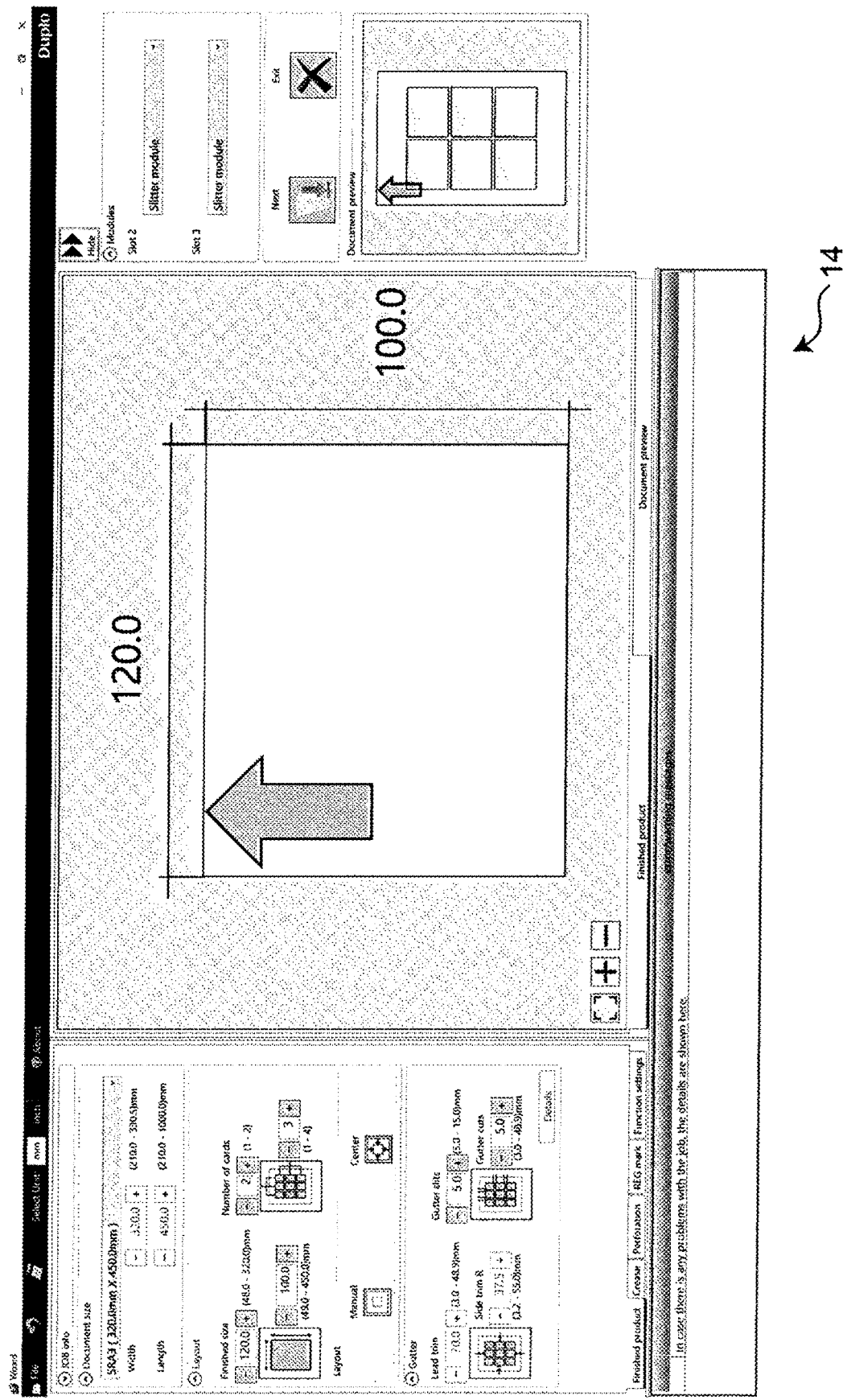
FIG. 8 is a view illustrating an example of an input screen when an operation parameter is set.
Figure 9:
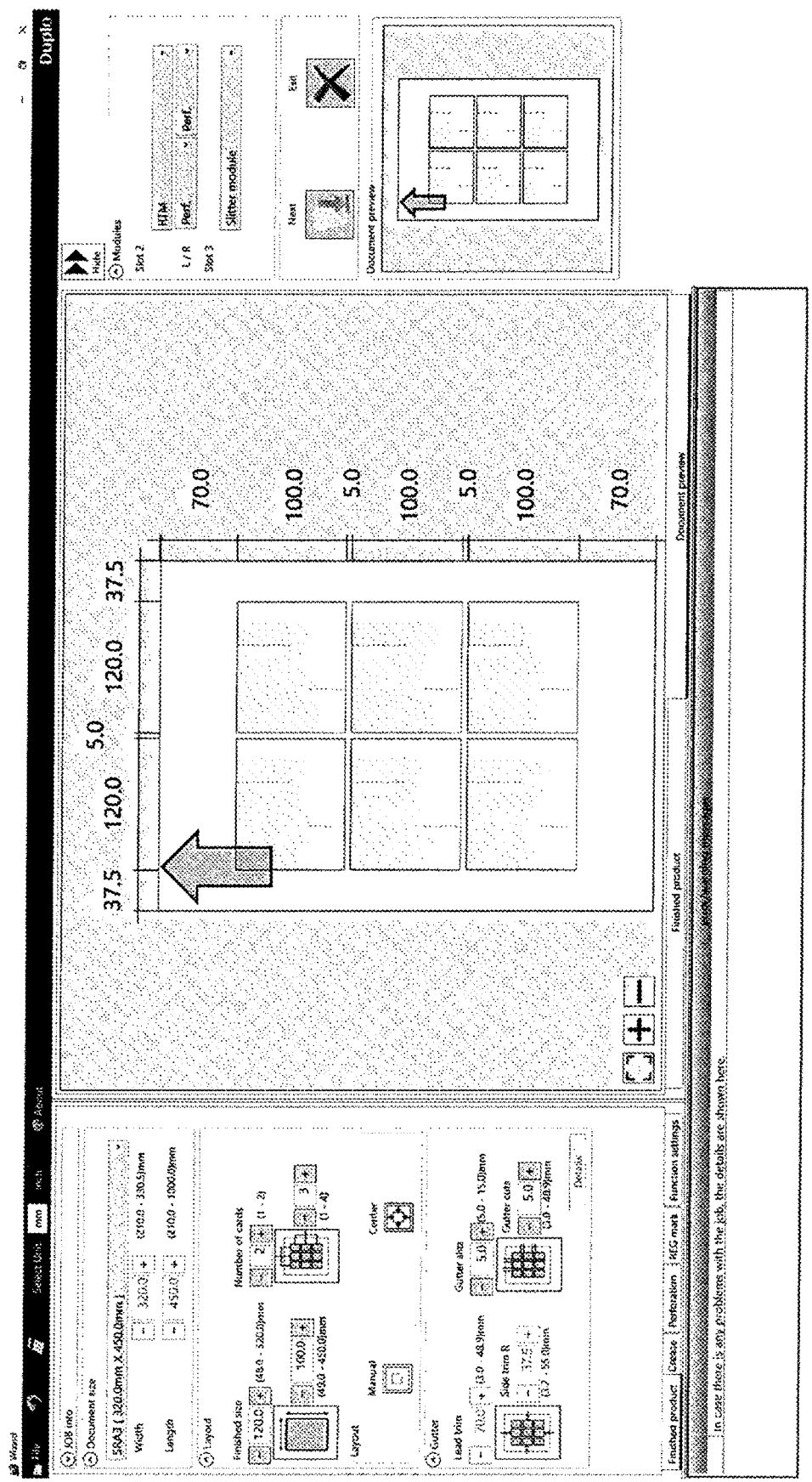
FIG. 9 is a view illustrating an example of an input screen when an operation parameter is set.

FIGS. 7 to 9 illustrates input contents and setting contents displayed on the display unit of the external setting unit 14. A GUI (Graphical User Interface) is used for input operation of input contents and display of setting contents. Thereby, the displayed contents can be intuitively grasped and can be used without special knowledge.

FIG. 7 illustrates an imposition operation screen for laying out the pre-product 101 on the sheet 100. The left side of FIG. 7 is a part for inputting the size of the sheet 100, the size of the product 105, the number of impositions, the size of the margin 102, etc. In the center of FIG. 7, the pre-product 101 to be laid out on the sheet 100 is displayed in an enlarged manner. The upper right of FIG. 7 is a part for inputting what kind of processing is performed. The lower right of FIG. 7 is a part for displaying the entire image of the sheet 100.

FIG. 8 illustrates an input operation screen for the portion-to-be-processed 111. The left side of FIG. 8 is a part for inputting the type, processing position, size, etc., of the portion-to-be-processed 111. In the center of FIG. 8, the pre-product 101 having the portion-to-be-processed 111 is displayed in an enlarged manner. FIG. 8 illustrates an example of forming two perforations as the portion-to-be-processed 111.

FIG. 9 illustrates a screen for confirming the contents input and set in FIGS. 7 and 8. In the center of FIG. 9, the entire image of the sheet 100 on which the pre-product 101 having the portion-to-be-processed 111 is laid out is displayed.

The external setting unit 14 can present a screen for inputting and setting specific numbers in order to finely adjust the size, position, and number of the individual product 105 and the portion-to-be-processed 111.

(Procedure for Setting Operation Parameter)

Next, a procedure for setting an operation parameter in the sheet processing apparatus 1 will be described with reference to FIGS. 10 to 13.

Figure 10:
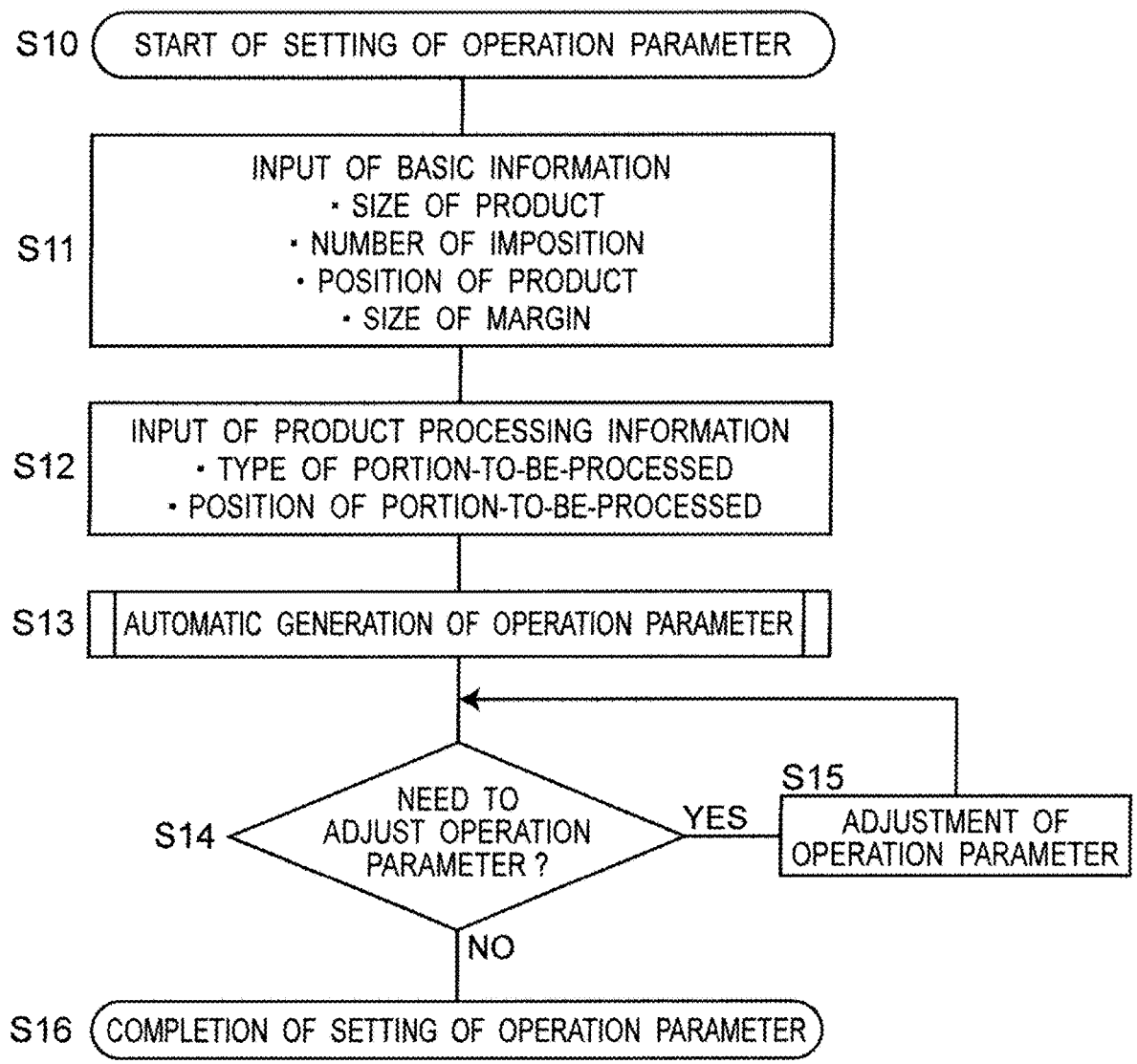
FIG. 10 is a flowchart when an operation parameter is set.

The overall procedure for setting the operation parameter will be described with reference to FIG. 10. In a step S10 of FIG. 10, the setting of the operation parameter starts. In a step S11, basic information is input in the external setting unit 14. The basic information is, for example, the size of the product 105, the number and positions of impositions, and the size of the margin 102.

In a step S12, product processing information is input in the external setting unit 14. The product processing information includes, for example, the type, processing position, size, etc., of the portion-to-be-processed 111. In a step S13, an operation parameter is generated in the external setting unit 14 based on the basic information and the product processing information.

In a step S14, the generated operation parameter is presented in the external setting unit 14, and it is determined whether the generated operation parameter is appropriate. In the step S14, when a user determines that the generated operation parameter needs to be adjusted (YES in the step S14), the user adjusts the generated operation parameter (step S15). When a user determines that the generated operation parameter does not need to be adjusted (NO in the step S14), the setting of the operation parameter is completed (step S16).

The generation of the operation parameter in the step S13 will be described with reference to FIG. 11.

Figure 11:
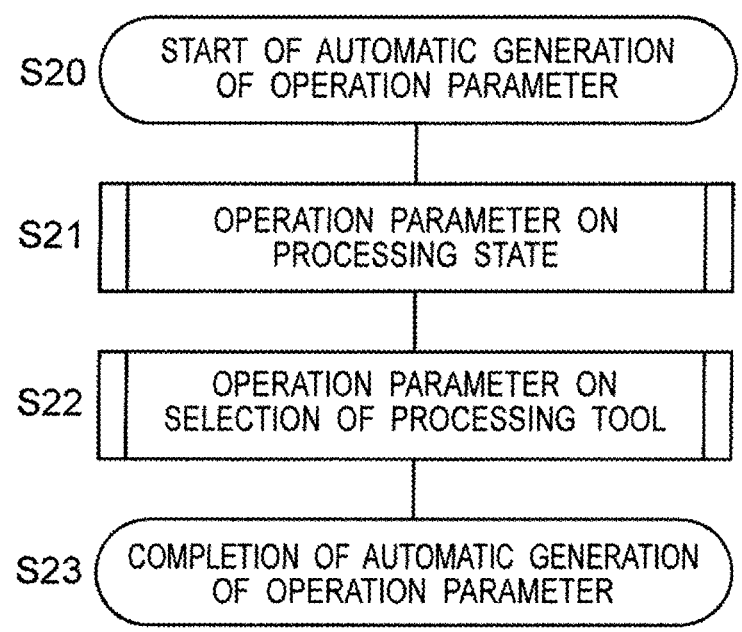
FIG. 11 is a flowchart when an operation parameter is automatically generated.

In a step S20 of FIG. 11, the generation of operation parameters starts. In a step S21, an operation parameter on a processing state is calculated. In a step S22, an operation parameter on the selection of the processing tools 20a, 20b, 21a, 21b is calculated. In a step S23, the generation of the operation parameters is completed. The operation parameters are generated by the calculation unit of the external setting unit 14.

The calculation of the operation parameter on a processing state in the step S21 will be described with reference to FIG. 12.

Figure 12:
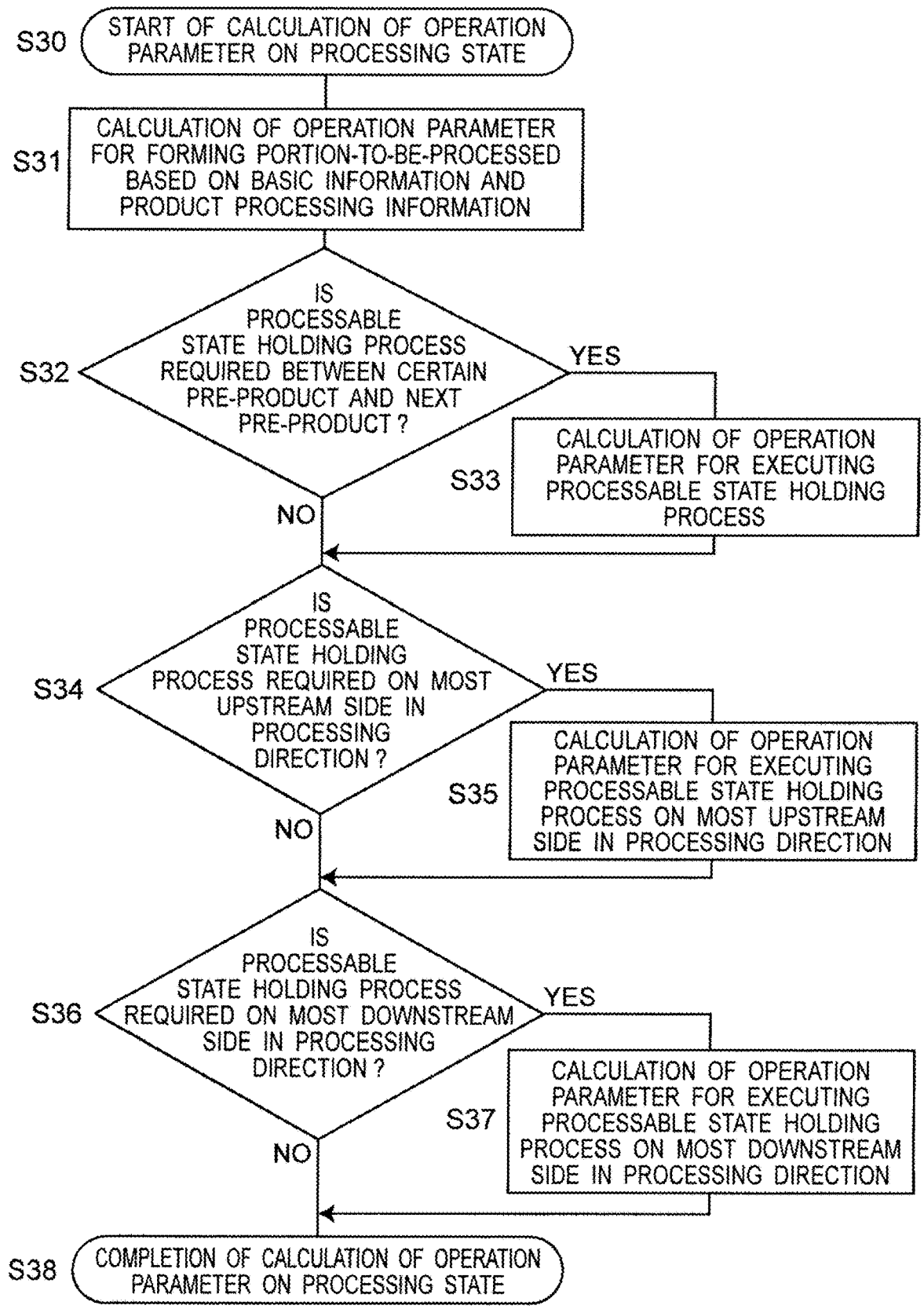
FIG. 12 is a flowchart when an operation parameter on a processing state is calculated.

In a step S30 of FIG. 12, the calculation of the operation parameter on a processing state starts. In a step S31, an operation parameter for forming the portion-to-be-processed 111 is calculated based on the basic information and the product processing information.

In a step S32, it is determined whether or not a processable state holding process is required between a certain pre-product 101 and the next pre-product 101 to be processed following the certain pre-product 101. Herein, the processable state holding process means that after a certain processing tool 20a, 20b, 21a, 21b forms a certain portion-to-be-processed 111 in a certain pre-product 101, the certain processing tool 20a, 20b, 21a, 21b moves to the formation of the next portion-to-be-processed 111 in the next pre-product 101, while the processable state is being held.

In the step S32, when it is determined that the processable state holding process is required (YES in the step S32), an operation parameter for executing the processable state holding process is calculated (step S33), and thereafter, the step moves to a step S34. In the step S32, when it is determined that the processable state holding process is not required (NO in the step S32), the step moves to the step S34.

In the step S34, it is determined whether or not the processable state holding process is required on the most upstream side in a processing direction. Herein, the processing direction means that: if the extending direction of the portion-to-be-processed 111 is parallel to the conveyance direction F, the conveyance direction F corresponds to the processing direction; and if the extending direction of the portion-to-be-processed 111 is parallel to the conveyance perpendicular direction, the conveyance perpendicular direction corresponds to the processing direction.

In the step S34, when it is determined that the processable state holding process is required on the most upstream side in the processing direction (YES in the step S34), an operation parameter for executing the processable state holding process on the most upstream side in the processing direction is calculated (step S35), and thereafter, the step moves to a step S36. In the step S34, when it is determined that the processable state holding process is not required on the most upstream side in the processing direction (NO in the step S34), the step moves to the step S36.

In the step S36, it is determined whether or not the processable state holding process is required on the most downstream side in the processing direction. In the step S36, when it is determined that the processable state holding process is required on the most downstream side in the processing direction (YES in the step S36), an operation parameter for executing the processable state holding process on the most downstream side in the processing direction is calculated (step S37), and thereafter, the step moves to a step S38. In the step S36, when it is determined that the processable state holding process is not required on the most downstream side in the processing direction (NO in the step S36), the step moves to the step S38. In the step S38, the calculation of the operation parameter on the processing state is completed.

The calculation of an operation parameter on the selection of the processing tools 20a, 20b, 21a, 21b, 22a, 22b, 23a, 23b in the step S22 will be described with reference to FIG. 13.

Figure 13:
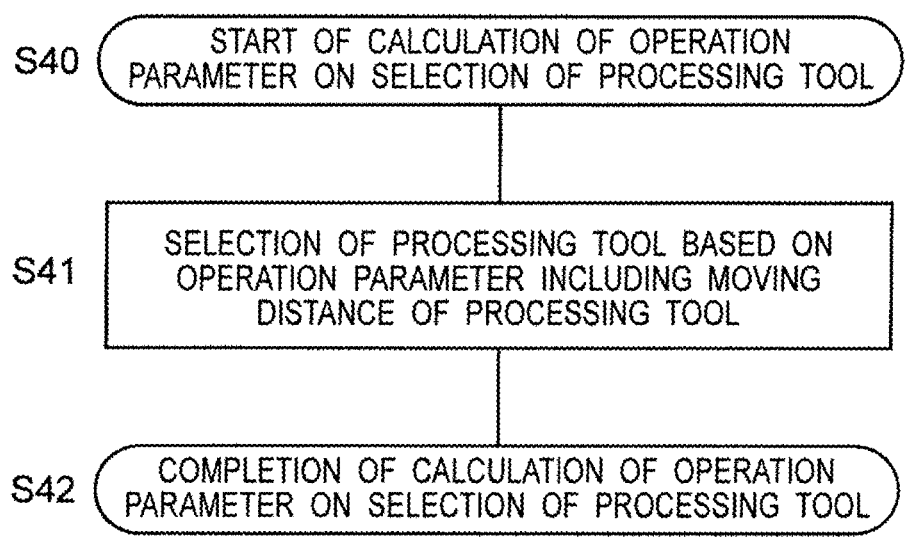
FIG. 13 is a flowchart when an operation parameter on the selection of a processing tool is calculated.

The calculation of the operation parameter on the selection of the processing tools 20a, 20b, 21a, 21b, 22a, 22b, 23a, 23b starts in a step S40 of FIG. 13. An operation parameter on moving distance is calculated such that a processing tool is selected from the processing tools 20a, 20b, 21a, 21b, 22a, 22b, 23a, 23b so that the distance when the processing tool 20a, 20b, 21a, 21b, 22a, 22b, 23a, 23b is moved to the portion-to-be-processed 111, that is, the moving distance of the processing tools 20a, 20b, 21a, 21b, 22a, 22b, 23a, 23b can be minimized. In a step S41, a processing tool is selected from the processing tools 20a, 20b, 21a, 21b, 22a, 22b, 23a, 23b based on the operation parameter including the moving distance of the processing tools 20a, 20b, 21a, 21b, 22a, 22b, 23a, 23b. In a step S42, the calculation of the operation parameter on the selection of the processing tools 20a, 20b, 21a, 21b, 22a, 22b, 23a, 23b is completed.

As described above, by setting the operation parameters such that: when a certain portion-to-be-processed 111 is formed in a certain pre-product 101 and then the next portion-to-be-processed 111 of the same type as the certain portion-to-be-processed 111 is formed in the next pre-product 101, the processable state is held; and/or a processing tool is selected from the processing tools 20a, 20b, 21a, 21b, 22a, 22b, 23a, 23b so that the moving distance of the processing tools 20a, 20b, 21a, 21b, 22a, 22b, 23a, 23b is minimized, the time required for processing can be minimized.

Although specific embodiments of this invention have been described, this invention is not limited to the embodiments, and various modifications can be made within the scope of this invention. For example, an embodiment in which the contents described in the above embodiments are appropriately combined may be adopted as one embodiment of this invention.

An operation parameter can be set such that when a certain portion-to-be-processed 111 is formed in a certain pre-product 101 and then the next portion-to-be-processed 111 of the same type as the certain portion-to-be-processed 111 is formed in the next pre-product 101, the processable state is held. Also, an operation parameter can be set such that: a processing tool is selected from the processing tools 20a, 20b, 21a, 21b, 22a, 22b, 23a, 23b so that the moving distance of the processing tools 20a, 20b, 21a, 21b, 22a, 22b, 23a, 23b is minimized. That is, an operation parameter can be set by one of the operation parameter on the processing state and the operation parameter for selecting the processing tool. According to this configuration, the time required for processing can be minimized, appropriately corresponding to the usage form of the sheet processing apparatus 1.

When the processing units are provided in multiple rows, processing tools in multiple rows can be allocated, as illustrated, for example, in FIGS. 6A, 6B, 14A, 14B, and 15. Before the formation of the downstream side portion-to-be-processed is completed by the processing tool for downstream side processing, or without the processing tool for upstream side processing interfering with the processing tool for downstream side processing, the processing tool for upstream side processing can be moved to a position corresponding to the upstream side portion-to-be-processed. Thereby, a plurality of the processing tools can be moved in parallel, and the total processing time can be shortened.

When a plurality of processing tools included in a corresponding processing tool group are installed in the processing unit, the processing tools can be allocated according to the number of the processing tools to be installed. When the number of the processing tools to be installed is large, a plurality of the processing tools can be moved in parallel by allocating to as many processing tools as possible, and hence the total processing time can be shortened.

Since the time required for movement can be shortened by minimizing the moving distance of the processing tool, the time required for processing can be minimized. Further, the total processing time can be shortened by moving a plurality of the processing tools in parallel.

An aspect can be adopted, in which the sheet 100 includes: a portion-to-be-processed 111 and a marginal portion-to-be-processed 112 that extend linearly in the conveyance direction F; and a portion-to-be-processed 111 and a marginal portion-to-be-processed 112 that extend linearly in the conveyance perpendicular direction. According to this configuration, the length-to-be-processed of each of the portion-to-be-processed 111 and the marginal portion-to-be-processed 112 is minimized, and hence the time required for processing can be minimized.

An aspect can be adopted by simultaneously controlling the movement of the sheet 100 in the conveyance direction F and the movement of the processing tools 20a, 20b, 21a, 21b, 22a, 22b, 23a, 23b in the conveyance perpendicular direction, in which the portion-to-be-processed 111, the marginal portion-to-be-processed 112, and the continuous portion-to-be-processed 110 extend in a curved shape. According to this configuration, it is possible to cope with the formation of the portion-to-be-processed 111 having various shapes.

An aspect in which the processing units are arranged in three or more rows in the conveyance direction F, or an aspect in which the number of processing tools included in the processing unit is three or more can be adopted. An aspect can be adopted, in which as the processing tools included in the processing unit, different types of processing tools are mixed. One sheet processing apparatus 1 can cope with the formation of various portions-to-be-processed 111. An aspect can be adopted, in which the sheet processing apparatus 1 conversely serves as a dedicated apparatus for forming a specific type of portion-to-be-processed 111 by including one processing tool for one processing unit.

In selecting the processing tools 20a, 20b, 21a, 21b, 22a, 22b, 23a, 23b, an operation parameter in consideration of the total use time of each processing tool 20a, 20b, 21a, 21b, 22a, 22b, 23a, 23b can also be set. According to this configuration, a specific processing tool can be prevented from being used intensively.

The display setting unit 13 provided in the apparatus main body 2 includes an input unit for inputting information, a display unit for displaying input contents, setting contents, etc., and a calculation unit for calculating and generating an operation parameter based on the input contents and setting contents. According to this configuration, a function equivalent to that of the external setting unit 14, that is, a setting function of setting an operation parameter can be provided.

This invention and embodiments are summarized as follows.

A sheet processing apparatus 1 according to one embodiment of this invention is one that forms a portion-to-be-processed 111 on a sheet 100 having a pre-result 101, the sheet processing apparatus 1 including:

at least one processing tool 20a, 20b, 21a, 21b, 22a, 22b, 23a, 23b, which takes a processable state in which the portion-to-be-processed 111 is allowed to be formed and an unprocessable state in which the portion-to-be-processed 111 is not allowed to be formed;

a setting unit 13, 14 that sets operation parameters on the processable state and the unprocessable state; and a control unit 6 that controls an operation of the processing tools 20a, 20b, 21a, 21b, 22a, 22b, 23a, 23b based on the set operation parameters, in which the setting unit 13, 14 sets the operation parameters such that: a processable state holding process in which the processing tools 20a, 20b, 21a, 21b, 22a, 22b, 23a, 23b hold the processable state, is executed, when a certain portion-to-be-processed 111 is formed in a certain pre-product 101 and then a next portion-to-be-processed 111 of the same type as the certain portion-to-be-processed 111 is formed in a next pre-product 101; and/or a processing tool selection process in which a processing tool is selected from the processing tools 20a, 20b, 21a, 21b, 22a, 22b, 23a, 23b so that a moving distance of the processing tools 20a, 20b, 21a, 21b, 22a, 22b, 23a, 23b for forming the portion-to-be-processed 111 is minimized, is executed.

According to the above configuration, by setting the operation parameters such that: the processable state is held, when a certain portion-to-be-processed 111 is formed in a certain pre-product 101 and then a next portion-to-be-processed 111 of the same type as the certain portion-to-be-processed 111 is formed in a next pre-product 101; and/or a processing tool is selected from the processing tools 20a, 20b, 21a, 21b, 22a, 22b, 23a, 23b so that the moving distance of the processing tools 20a, 20b, 21a, 21b, 22a, 22b, 23a, 23b is minimized, the time required for processing can be minimized.

Also, in the sheet processing apparatus 1 of one embodiment, when a margin 102 is provided around the pre-product 101, the setting unit 13, 14 sets the operation parameters such that a marginal portion-to-be-processed 112 is formed in the margin 102 by executing the processable state holding process.

According to the above configuration, by forming the marginal portion-to-be-processed 112 in the margin 102, the lifting operation time of the processing tools 20a, 20b, 21a, 21b, 22a, 22b, 23a, 23b and the time to stop and restart the conveyance of the sheet 100 can be omitted; and hence the time required for processing can be minimized.

Also, in the sheet processing apparatus 1 of one embodiment, the portion-to-be-processed 111 and the marginal portion-to-be-processed 112 extend linearly.

According to the above configuration, the length-to-be-processed of the portion-to-be-processed 111 and the marginal portion-to-be-processed 112 is minimized, and hence the time required for processing can be minimized.

Also, in the sheet processing apparatus 1 of one embodiment, the portion-to-be-processed 111 and the marginal portion-to-be-processed 112 extend linearly in the conveyance direction F and/or the conveyance perpendicular direction.

According to the above configuration, the length-to-be-processed of the portion-to-be-processed 111 and the marginal portion-to-be-processed 112 is minimized in the conveyance direction F and/or the conveyance perpendicular direction, and hence the time required for processing can be minimized.

Also, in the sheet processing apparatus 1 of one embodiment, when the processing tool 20a, 20b, 21a, 21b, 22a, 22b, 23a, 23b moves relatively with respect to the sheet 100 so as to draw, for example, an inversed C-shaped or C-shaped trajectory in the conveyance perpendicular direction, the conveyance direction F, and the conveyance perpendicular direction, the processing tool 20a, 20b, 21a, 21b, 22a, 22b, 23a, 23b is located outside the sheet 100.

According to the above configuration, the reverse movement of the processing tool 20a, 20b, 21a, 21b, 22a, 22b, 23a, 23b becomes easy.

Also, in the sheet processing apparatus 1 of one embodiment, when, for example, the processing tools 20a, 20b, 21a, 21b include a plurality of types of the processing tools, and of the plurality of types, a certain type corresponding to the portion-to-be-processed 111 constitutes a corresponding processing tool group including a plurality of corresponding processing tools 20a, 20b, 21a, the setting unit 13, 14 sets the operation parameters such that in the processing tool selection process, any corresponding processing tool 20a, 20b, 21a is selected to be used from the corresponding processing tool group in order to minimize the moving distance or the time required for movement of the corresponding processing tool 20a, 20b, 21a.

According to the above configuration, the optimal corresponding processing tool 20a, 20b, 21a is selected from the corresponding processing tool group, and hence the time required for processing can be minimized.

Also, in the sheet processing apparatus 1 of one embodiment, when, for example, the corresponding processing tool group is arranged in multiple rows in the conveyance direction, the setting unit 13, 14 set the operation parameters such that in the processing tool selection process, any corresponding processing tool 20a, 20b, 21a in any row is selected to be used in order to minimize the moving distance or the time required for the movement of the corresponding processing tool 20a, 20b, 21a.

According to the above configuration, the optimal corresponding processing tool 20a, 20b, 21a is selected from the corresponding processing tool group, and hence the time required for processing can be minimized.

Also, a sheet processing apparatus 1 of one embodiment is, for example, one that forms a pre-product 101 having the portion-to-be-processed 111 on a sheet 100, the sheet processing apparatus 1 including:

at least one processing tool 20a, 20b, 21a, 21b that takes a processable state in which the portion-to-be-processed 111 is allowed to be formed and an unprocessable state in which the portion-to-be-processed 111 is not allowed to be formed; and a control unit 6 that controls an operation state of the processing tool 20a, 20b, 21a, 21b, in which the control unit 6 controls the processing tool 20a, 20b, 21a, 21b such that: a processable state holding process in which the processing tool 20a, 20b, 21a, 21b holds the processable state, is executed, when the processing tool 20a, 20b, 21a, 21b moves from the formation of the portion-to-be-processed 111 in a certain pre-product 101 to the formation of the portion-to-be-processed 111 in a next pre-product 101; and/or a processing tool selection process in which the processing tool 20a, 20b, 21a, 21b is selected so that the moving distance of the processing tool 20a, 20b, 21a, 21b for forming the portion-to-be-processed 111 is minimized, is executed.

According to the above configuration, by setting the operation parameters such that: when a certain portion-to-be-processed 111 is formed in a certain pre-product 101 and then a next portion-to-be-processed 111 of the same type as the certain portion-to-be-processed 111 is formed in a next pre-product 101, the processable state is held; and/or the processing tool 20a, 20b, 21a, 21b is selected so that the moving distance of the processing tool 20a, 20b, 21a, 21b is minimized, the time required for processing can be minimized.

EXPLANATION OF SYMBOLS

1 Sheet processing apparatus
2 Apparatus main body
3 Supply unit
4 Roller
5 Cutting processing unit
5a Upstream side roller pair
5b Downstream side roller pair
6 Control unit (CPU)
7 Supply device
8 Suction conveyance mechanism
9 Skew conveyance mechanism
10 Conveyance route
11 Trash box
13 Display setting unit (Setting unit)
14 External setting unit (Setting unit)
18 Discharge tray
20 First processing unit
20a First processing tool (Processing tool, Corresponding processing tool)
20b Second processing tool (Processing tool, Corresponding processing tool)
21 Second processing unit
21a Third processing tool (Processing tool, Corresponding processing tool)
21b Fourth processing tool (Processing tool, Corresponding processing tool)
22 Third processing unit
22a Fifth processing tool (Processing tool, Corresponding processing tool)
22b Sixth processing tool (Processing tool, Corresponding processing tool)
23 Fourth processing unit
23a Seventh processing tool (Processing tool, Corresponding processing tool)
23b Eighth processing tool (Processing tool, Corresponding processing tool)
30 Supply table
34 Cutting blade
100 Sheet
101 Pre-product
102 Margin
105 Product
110 Continuous portion-to-be-processed
111 Portion-to-be-processed
112 Marginal portion-to-be-processed
113 Outside margin portion-to-be-processed
120 Unprocessable portion
F Conveyance direction

What is claimed is:

1. A sheet processing apparatus that processes a portion-to-be-processed on a sheet having a plurality of pre-products, the sheet processing apparatus comprising:
at least one processing tool that is changeable between a processable state in which the portion-to-be-processed is processed on the sheet and an unprocessable state in which the portion-to-be-processed is not processed on the sheet, and performs processing on the sheet in a conveyance perpendicular direction perpendicular to a conveyance direction of the sheet;
a setting unit that sets operation parameters on the processable state and the unprocessable state; and
a control unit that controls an operation of the processing tool based on the set operation parameters,
wherein the setting unit includes a processable state holding process in which the at least one processing tool remains in the processable state when a first portion-to-be-processed is processed in a first pre-product and the setting unit maintains the at least one processing tool in the processable state until after a second portion-to-be-processed of the same type as the first portion-to-be-processed is processed in a second pre-product on the sheet, and
wherein the setting unit includes an unprocessable state holding process in which the at least one processing tool remains in the unprocessable state before the first portion-to-be-processed is processed or when the second portion-to-be-processed is not processed after the first portion-to-be-processed is processed, and
wherein when a margin is provided around one of the pre-products, a first marginal portion-to-be-processed which extends from the first portion-to-be-processed is processed in the margin and a second marginal portion-to-be-processed which extends from the second portion-to-be-processed is processed in the margin, the setting unit sets the operation parameters such that the processing tool remains in the processable state and draws an outside margin portion-to-be-processed with an inverted C-shaped trajectory or a C-shaped trajectory outside the conveyance perpendicular direction in order to connect the first marginal portion-to-be-processed and second marginal portion-to-be-processed.

2. The sheet processing apparatus according to claim 1, wherein when a margin is provided around the pre-product, the setting unit sets the operation parameters such that a marginal portion-to-be-processed is processed in the margin by executing the processable state holding process.

3. The sheet processing apparatus according to claim 1, wherein the portion-to-be-processed and the marginal portion-to-be-processed extend linearly perpendicular to the conveyance direction.

4. The sheet processing apparatus according to claim 1, wherein the inverted C-shaped or C-shaped trajectory includes a trajectory in the conveyance perpendicular direction.

5. The sheet processing apparatus according to claim 1, wherein the sheet processing apparatus includes a plurality of processing tools, and when the processing tools include a plurality of types, and of the plurality of types, a certain type corresponding to the portion-to-be-processed constitutes a corresponding processing tool group including a plurality of corresponding processing tools, the setting unit sets the operation parameters so as to select, in a processing tool selection process, any corresponding processing tool to be used from the corresponding processing tool group in order to minimize a moving distance or a time required for movement of the corresponding processing tool.

6. The sheet processing apparatus according to claim 5, wherein when the corresponding processing tool groups are arranged in multiple rows in the conveyance direction, the setting unit sets the operation parameters so as to select, in the processing tool selection process, any corresponding processing tool in any row to be used in order to minimize a moving distance or a time required for movement of the corresponding processing tool.

7. The sheet processing apparatus according to claim 1, wherein the setting unit includes a processing tool selection process in which the processing tool for processing the portion-to-be-processed is selected so that a moving distance of the processing tool is minimized, is executed.

8. The sheet processing apparatus according to claim 1, wherein the control unit includes a processing tool selection process in which the processing tool for processing the portion-to-be-processed is selected so that a moving distance of the processing tool is minimized.

9. A sheet processing apparatus that processes a portion-to-be-processed on a sheet having a plurality of pre-products, the sheet processing apparatus comprising:

at least one processing tool that is changeable between from a processable state in which the portion-to-be-processed is processed on the sheet and an unprocessable state in which the portion-to-be processed is not processed on the sheet, and performs processing on the sheet in a conveyance perpendicular direction perpendicular to a conveyance direction of the sheet; and a control unit that controls an operation state of the processing tool, wherein the control unit controls the processing tool such that a processable state holding process in which the at least one processing tool remains in the processable state when a first portion-to-be-processed is processed in a first pre-product and the control unit maintains the at least one processing tool in the processable state until after a second portion-to-be-processed is processed in a second pre-product, is executed wherein the control unit controls the at least one processing tool such that an unprocessable state holding process in which the at least one processing tool remains in the unprocessable state when the at least one processing tool does not move from processing the first portion-to-be-processed in the first pre-product to processing the second portion-to-be-processed in the second pre-product, is executed, and wherein when a margin is provided around one of the pre-products, a first marginal portion-to-be-processed which extends from the first portion-to-be-processed is processed in the margin and a second marginal portion-to-be-processed which extends from the second portion-to-be-processed is processed in the margin, the control unit controls such that the processing tool remains in the processable state and draws an outside margin portion-to-be-processed with an inverted C-shaped trajectory or a C-shaped trajectory outside the conveyance perpendicular direction in order to connect the first marginal portion-to-be-processed and second marginal portion-to-be-processed.

* * * * *